(12) United States Patent
Sundararajan et al.

(10) Patent No.: US 11,509,718 B2
(45) Date of Patent: Nov. 22, 2022

(54) TECHNIQUES FOR COORDINATING PARALLEL PERFORMANCE AND CANCELLATION OF COMMANDS IN A STORAGE CLUSTER SYSTEM

(71) Applicant: NetApp Inc., Sunnyvale, CA (US)

(72) Inventors: Manoj Sundararajan, Sunnyvale, CA (US); Paul Yuedong Mu, Sunnyvale, CA (US); Paul Ngan, Sunnyvale, CA (US)

(73) Assignee: NetApp Inc., San Jose, CA (US)

( * ) Notice: Subject to any disclaimer, the term of this patent is extended or adjusted under 35 U.S.C. 154(b) by 0 days.

(21) Appl. No.: 16/774,108

(22) Filed: Jan. 28, 2020

(65) Prior Publication Data
US 2020/0162555 A1  May 21, 2020

Related U.S. Application Data

(63) Continuation of application No. 14/491,799, filed on Sep. 19, 2014, now Pat. No. 10,587,688.

(51) Int. Cl.
*H04L 29/08* (2006.01)
*H04L 29/06* (2006.01)
(Continued)

(52) U.S. Cl.
CPC ...... *H04L 67/1097* (2013.01); *G06F 11/2071* (2013.01); *G06F 11/2089* (2013.01);
(Continued)

(58) Field of Classification Search
CPC . H04L 67/1097; H04L 67/1095; H04L 69/22; G06F 11/2071; G06F 11/2089; G06F 11/2092; G06F 11/2097
(Continued)

(56) References Cited

U.S. PATENT DOCUMENTS 6,859,824 B1 * 2/2005 Yamamoto .............. H04L 29/06
370/468
7,120,631 B1 * 10/2006 Vahalia ............... G06F 16/1774
(Continued)

FOREIGN PATENT DOCUMENTS

CN  103064757 A  4/2013

OTHER PUBLICATIONS

International Search Report and Written Opinion for Application No. PCT/US2015/050925 dated Dec. 17, 2015, 14 pages.
(Continued)

*Primary Examiner* — Schquita D Goodwin
(74) *Attorney, Agent, or Firm* — Cooper Legal Group, LLC

(57) ABSTRACT

Various embodiments are directed to techniques for coordinating at least partially parallel performance and cancellation of data access commands between nodes of a storage cluster system. An apparatus may include a processor component of a first node coupled to a first storage device storing client device data; an access component to perform replica data access commands of replica command sets on the client device data, each replica command set assigned a set ID; a communications component to analyze a set ID included in a network packet to determine whether a portion of a replica command set in the network packet is redundant, and to reassemble the replica command set from the portion based if the portion is not redundant; and an ordering component to provide the communications component with set IDs of replica command sets of which the access component has fully performed the set of replica data access commands.

20 Claims, 19 Drawing Sheets

(51) Int. Cl.
*G06F 11/20* (2006.01)
*H04L 67/1097* (2022.01)
*H04L 69/22* (2022.01)
*H04L 67/1095* (2022.01)

(52) U.S. Cl.
CPC .......... *H04L 67/1095* (2013.01); *H04L 69/22* (2013.01); *G06F 11/2092* (2013.01); *G06F 11/2097* (2013.01)

(58) Field of Classification Search
USPC ...................................................... 709/212
See application file for complete search history.

(56) References Cited

U.S. PATENT DOCUMENTS

| | | | |
|---|---|---|---|
| 7,415,591 B1 | 8/2008 | Todd et al. | |
| 7,657,537 B1* | 2/2010 | Corbett | G06F 15/17331 |
| | | | 711/112 |
| 7,827,144 B1* | 11/2010 | Saito | G06F 16/2322 |
| | | | 707/638 |
| 8,332,473 B1* | 12/2012 | Fouts | H04L 67/2823 |
| | | | 709/206 |
| 8,396,840 B1* | 3/2013 | McHugh | G06F 3/065 |
| | | | 707/690 |
| 8,577,902 B1 | 11/2013 | Ye et al. | |
| 8,725,686 B2 | 5/2014 | Watanabe et al. | |
| 8,924,656 B1 | 12/2014 | Usgaonkar et al. | |
| 9,128,903 B2* | 9/2015 | Takemoto | G06F 11/1662 |
| 9,235,632 B1 | 1/2016 | Natanzon | |
| 9,298,633 B1 | 3/2016 | Zhao et al. | |
| 9,531,809 B1* | 12/2016 | Brooker | G06F 3/0662 |
| 2003/0149920 A1* | 8/2003 | Elko | G06F 11/2097 |
| | | | 714/47.3 |
| 2004/0078637 A1* | 4/2004 | Fellin | G06F 11/1443 |
| | | | 707/E17.007 |
| 2005/0125465 A1* | 6/2005 | Arakawa | G06F 11/2058 |
| 2006/0168397 A1* | 7/2006 | Wightwick | G06F 3/065 |
| | | | 711/114 |
| 2006/0174076 A1* | 8/2006 | Takeda | G06F 11/2071 |
| | | | 711/162 |
| 2007/0254922 A1* | 11/2007 | Hiraiwa | G06F 11/2071 |
| | | | 514/338 |
| 2009/0049252 A1* | 2/2009 | Bartfai | G06F 11/2071 |
| | | | 711/154 |
| 2009/0064142 A1* | 3/2009 | Kajita | G06F 9/4843 |
| | | | 718/100 |
| 2009/0125692 A1 | 5/2009 | Yamamoto et al. | |
| 2009/0172417 A1 | 7/2009 | Mikami et al. | |
| 2010/0049928 A1* | 2/2010 | Harris, Jr. | G06F 11/2064 |
| | | | 711/162 |
| 2010/0082540 A1* | 4/2010 | Isaacson | G06F 16/27 |
| | | | 707/624 |
| 2012/0226852 A1 | 9/2012 | Chen et al. | |
| 2012/0284369 A1* | 11/2012 | Fishgait | G06F 16/13 |
| | | | 709/218 |
| 2013/0159556 A1 | 6/2013 | Mizumaki | |
| 2013/0268720 A1 | 10/2013 | Ito et al. | |
| 2013/0332484 A1 | 12/2013 | Gajic | |
| 2014/0047263 A1 | 2/2014 | Coatney et al. | |
| 2014/0139140 A1* | 5/2014 | Yeh | H05B 47/19 |
| | | | 315/297 |
| 2014/0164332 A1* | 6/2014 | Shan | G06F 11/1453 |
| | | | 707/650 |
| 2015/0106549 A1 | 4/2015 | Brown et al. | |
| 2015/0261443 A1 | 9/2015 | Wei et al. | |
| 2015/0278244 A1 | 10/2015 | Shvachko et al. | |
| 2015/0278397 A1 | 10/2015 | Hendrickson et al. | |
| 2015/0339923 A1 | 11/2015 | König et al. | |

OTHER PUBLICATIONS

"Hadoop High Availability through Metadata Replication," Jan. 2009; Feng Wang, Fie Qiu, Jie Yang, Bo Dong, Xinhui Li and Ying Li; Proceedings of the First international CIKM Workshop on Cloud Data Management, pp. 37-44.

Notification of the First Office Action in Chinese Application No. 2015800628386 dated Sep. 3, 2019, 2 pgs.

First Chinese Office Action cited in Chinese Application No. 201580062838.6 dated Sep. 3, 2019, 14 pgs.

\* cited by examiner

TECHNIQUES FOR COORDINATING PARALLEL PERFORMANCE AND CANCELLATION OF COMMANDS IN A STORAGE CLUSTER SYSTEM

RELATED APPLICATIONS

This application claims priority to and is a continuation of U.S. patent application Ser. No. 14/491,799, filed on Sep. 19, 2014 and titled "TECHNIQUES FOR COORDINATING PARALLEL PERFORMANCE AND CANCELLATION OF COMMANDS IN A STORAGE CLUSTER SYSTEM," which is incorporated herein by reference.

BACKGROUND

Remotely accessed storage cluster systems may include multiple interconnected nodes that may be geographically dispersed to perform the storage of client device data in a fault-tolerant manner and to enable the speedy retrieval of that data. Each of such nodes may include multiple interconnected modules, each of which may be specialized to perform a portion of the tasks of storing and retrieving client device data. Distant communications may need to occur on short notice among multiple ones of such nodes to coordinate handling of an error that may arise in the performance of such tasks. Thus, the architectures of such storage cluster systems may be quite complex.

In contrast, client devices may not be configured to monitor and/or control aspects of such complex architectures or the complexities of the manner in which they achieve fault tolerance. Client devices may communicate with storage cluster systems using protocols that are not well suited to convey the details of such complexities, and client devices may employ operating systems that provide little flexibility in dealing with delays arising from such complexities.

DETAILED DESCRIPTION

Figure 1:
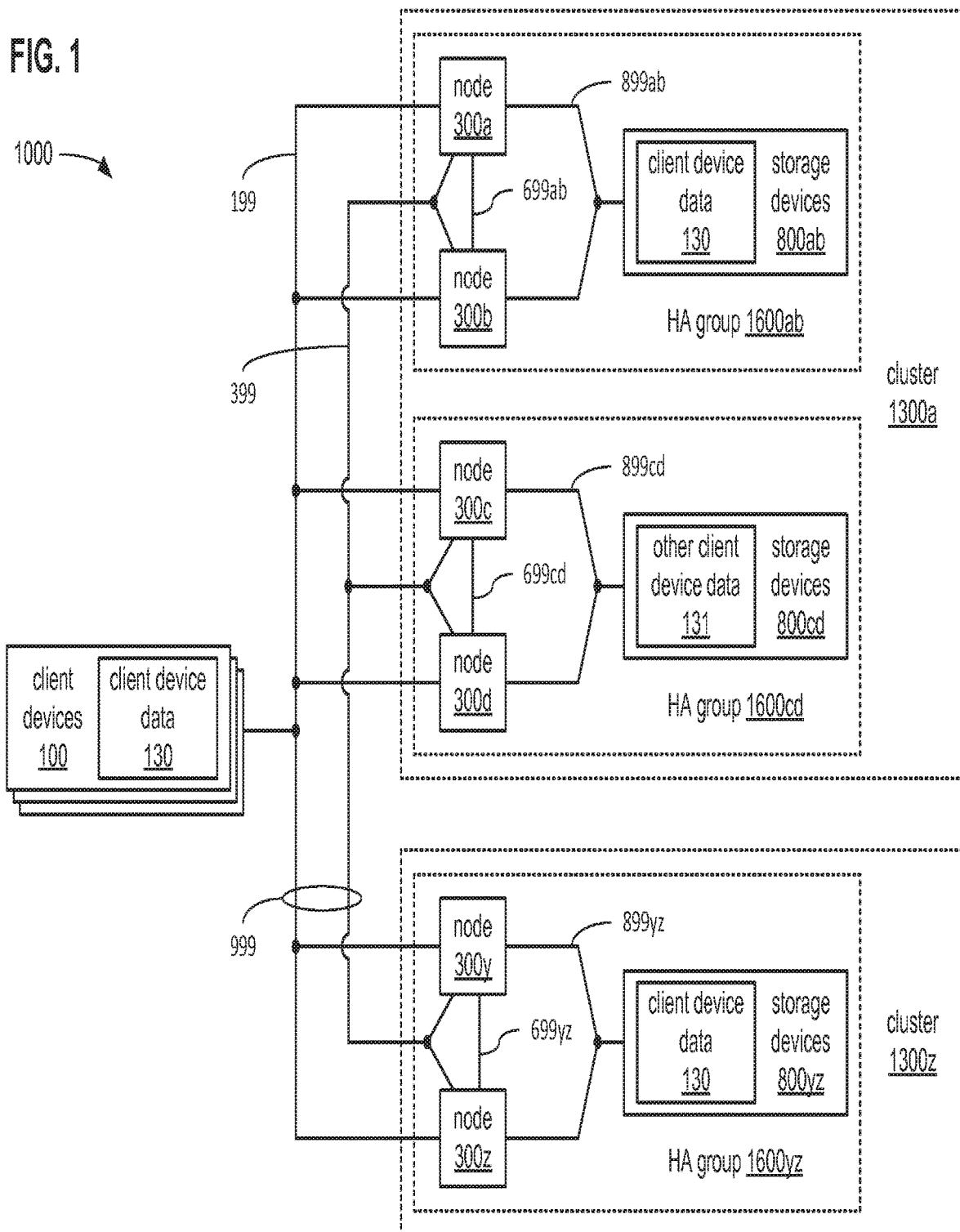
FIG. 1 illustrates an example embodiment of a storage cluster system.

Various embodiments are generally directed to techniques for coordinating the at least partially parallel performance and cancellation of data access commands between nodes of a storage cluster system. In a storage cluster system, multiple nodes may be grouped into two or more clusters that may each be made up of one or more high availability (HA) groups of nodes. The two or more clusters may be positioned at geographically distant locations and may be coupled via one or more interconnects extending through networks such as the Internet or dedicated leased lines. A single node of a HA group of each cluster may be an active node that communicates with the other(s) via an active communications session to exchange replicas of data access commands to enable at least partially parallel performance of those data access commands to synchronize the state of the client device data between their HA groups. Those active nodes may also exchange cancel commands to enable at least partially parallel performance of cancellation of data access commands to again synchronize the state of the client device data between their HA groups. Further, one of those active nodes may additionally communicate with one or more client devices to receive requests for storage services and to translate those requests into the data access commands. Within each HA group, at least one other node may be an inactive node partnered with the active node and prepared via duplication of metadata among the nodes within the HA group to take over for the active node in response to an error.

In support of such exchanges of replica data access commands, exchanges of cancel commands and such a takeover, multiple nodes of each HA group may cooperate to form a mesh of communications sessions thereamong that includes the one active communications session and multiple inactive communications sessions. As an inactive node of a HA group takes over for an active node in the same HA group in response to an error, the active communications session may become inactive and one of the inactive communication sessions may become the active communications session. In support of forming the mesh, metadata that includes network addresses of one or more of the other nodes may be duplicated and distributed among nodes within each HA group to minimize delays in forming the mesh following rebooting of one or more of the nodes.

Each of the nodes may include one or more of each of a management module (M-module), a network protocol module (N-module) and a data storage module (D-module). The M-module may couple an active node to a client interconnect to provide one or more client devices a mechanism by which at least a portion of the storage cluster system may be remotely configured. The N-module may couple an active node to the client interconnect to enable one or more client devices to transmit a request for storage services to the node.

The N-module may translate the storage services request into at least one data access command. The D-module may be coupled to the N-module to receive the at least one data access command therefrom. The D-module may also couple the node to one or more storage devices to store client device data and from which client device data may be retrieved. Individual ones of those storage devices and/or groups of those storage devices may be designated and treated by the D-module as logical units (LUs). The D-module may define an aggregate within the storage space provided by a single LU or a group of LUs, and may define one or more volumes within the storage space of that aggregate. The client device data may be stored within one or more volumes so defined within that aggregate.

In addition to performing a data access command received from the N-module, the D-module of one active node of a first HA group may replicate the data access command and transmit the resulting replica of that data access command to another D-module of another active node of a second HA group to enable at least partially parallel performance of the data access command by the D-modules of the two active nodes. Such transmission of a replica data access command may be performed via an inter-cluster interconnect that may extend through the same network through which the client interconnect may extend. The D-module of that other node may reply to the transmission of the replica data access command with an indication of success or failure in the performance of the replica data access command.

In support of enabling exchanges of replica data access commands and responses thereto between an active node of the first HA group and an active node of the second HA group, the two active nodes may cooperate to form and maintain an active communications session therebetween through the inter-cluster interconnect. In such an active communications session, information concerning the current state of each of the two active nodes may be recurringly exchanged therebetween. Also, inactive nodes of the first and second HA groups may also establish and maintain inactive communications sessions that extend between nodes of the first and second HA groups to support a takeover of the active node of either HA group by an inactive node of the same HA group in response to an error occurring within that active node. The two active nodes may exchange information concerning the inactive nodes of the first and second HA groups to enable the formation of those inactive communications sessions, thereby completing the mesh of communications sessions. In the event of an error resulting in the takeover of one of the active nodes by an inactive node, the active communications session between the two active nodes may become inactive while one of the inactive communications sessions may become the active communications session.

In support of forming and maintaining the mesh of communications sessions, the M-module, N-module and/or D-module of each active node may cooperate to derive, store and/or exchange metadata that includes indications of network addresses of multiple ones of the nodes of the first and second HA groups and/or other information pertinent to establishing at least a subset of the communications sessions of the mesh. Within each HA group, a M-module of an active node may receive information making up a portion of metadata and/or a N-module of the active node may perform tests to discover information making up another portion of metadata. One or both of the M-module and the N-module may then provide their portions of metadata to a D-module of the active node. The D-module may transmit a duplicate of the metadata to D-module(s) of one or more inactive nodes of the same HA group and may store a copy of the metadata within a volume and/or aggregate within one or more storage devices to which the D-modules of the active node and the one or more inactive nodes of the same HA group may share access. As a result, when one of such D-modules reboots following a reset or being powered up, that D-module may be able to retrieve information pertinent to its node establishing communications sessions with nodes of another HA group by retrieving the metadata from the one or more storage devices, and may then employ that information to form one or more of the communications sessions of the mesh more quickly. In embodiments in which different ones of the nodes in each of multiple HA groups may occasionally be rebooted for any of a variety of reasons, faster reestablishment of communications sessions following such a reboot may serve to minimize periods of time in which portions of such a mesh of communications sessions are not in place. Where errors are encountered that result in a change in which nodes and/or communications session(s) are active or inactive, the metadata stored within the one or more storage devices may be updated to enable faster reestablishment of communications sessions with the new configuration of active and inactive communications sessions following a reboot.

As the D-module of the active node of the first HA group replicates data access commands, that D-module may assign matching sequence identifiers (sequence IDs) to each data access command and its replica data access command that is transmitted to the D-module of the active node of the second HA group. The D-module of the active node of the first HA group may group multiple consecutive ones of the data access commands into command sets and group matching consecutive ones of the replica data access commands into matching replica command sets. Each new command set and matching replica command set may be created at a recurring interval of time and/or in response to various characteristics of the commands, themselves. The D-module of the active node of the first HA group may also assign matching set identifiers (set IDs) to the command sets and matching ones of the replica command sets. As each set of sequential ones of the replica data access commands are transmitted to the D-module of the active node of the second HA group, that D-module may employ both the sequence IDs assigned to each replica data access command and the set IDs assigned to each replica command set to more efficiently reassemble the replica command sets from portions thereof that may each be transmitted in a separate network packet. By way of example, the D-module of the active node of the second HA group may employ the set IDs to more efficiently identify and discard network packets conveying redundant portions of replica command sets that may be generated within the network through the network packets are transmitted.

The D-modules of the active nodes of the first and second HA groups may also employ the set IDs to coordinate and more speedily implement requests from a client device to cancel performance of a series of data access commands, and to do so at least partially in parallel. The D-module of the active node of the first HA group may determine the set IDs of the command sets and matching replica command sets that include the series of data access commands to be canceled. The D-module of the active node of the first HA group may then use those set IDs to select one or more of the command sets to discard and then do so as part of both ceasing and preventing further performance of the data access commands within the one or more command sets. The D-module of the active node of the first HA group may also signal the D-module of the active node of the second HA group with a cancel command conveying those set IDs. In response to receiving the cancel command, the active node of the second HA group may use those set IDs to select one or more of the replica command sets to discard and then do so as part of both ceasing and preventing further performance of the replica data access commands within the one or more replica command sets at least partially in parallel with the cessation and prevention of further performance of data access commands by the active node of the first HA group.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of a storage cluster system 1000 incorporating one or more client devices 100 and one or more clusters, such as the depicted clusters 1300*a* and 1300*z*. As depicted, the cluster 1300*a* may incorporate one or more of nodes 300*a-d* and sets of storage devices 800*ab* and 800*cd*, and the cluster 1300*z* may incorporate one or more of nodes 300*y-z* and a set of storage devices 800*yz*. As further depicted, the cluster 1300*a* may include a HA group 1600*ab* incorporating the nodes 300*a-b* as partners and the set of storage devices 800*ab*. The cluster 1300*a* may also include a HA group 1600*cd* incorporating the nodes 300*c-d* as partners and the set of storage devices 800*cd*. Correspondingly, the cluster 1300*z* may include a HA group 1600*yz* incorporating the nodes 300*y-z* as partners and the set of storage devices 800*yz*.

In some embodiments, the clusters 1300*a* and 1300*z* may be positioned at geographically distant locations to enable a degree of redundancy in storing and retrieving client device data 130 provided by one or more of the client devices 100 for storage. Such positioning may be deemed desirable to enable continued access to the client device data 130 by one or more of the client devices 100 despite a failure or other event that may render one or the other of the clusters 1300*a* or 1300*z* inaccessible to one or more of the client devices 100. As depicted, one or both of the clusters 1300*a* and 1300*z* may additionally store other client device data 131 that may be entirely unrelated to the client device data 130.

The formation of the HA group 1600*ab* with at least the two nodes 300*a* and 300*b* partnered to share access to the set of storage devices 800*ab* may enable a degree of fault tolerance in accessing the client device data 130 as stored within the set of storage devices 800*ab* by enabling one of the nodes 300*a-b* in an inactive state to take over for its partner in an active state (e.g., the other of the nodes 300*a-b*) in response to an error condition within that active one of the nodes 300*a-b*. Correspondingly, the formation of the HA group 1600*yz* with at least the two nodes 300*y* and 300*z* partnered to share access to the set of storage devices 800*yz* may similarly enable a degree of fault tolerance in accessing the client device data 130 as stored within the set of storage devices 800*yz* by similarly enabling one of the nodes 300*y-z* in an inactive state to similarly take over for its partner in active state (e.g., the other of the nodes 300*y-z*).

As depicted, any active one of the nodes 300*a-d* and 300*y-z* may be made accessible to the client devices 100 via a client interconnect 199. As also depicted, the nodes 300*a-d* and 300*y-z* may be additionally coupled via an inter-cluster interconnect 399. In some embodiments, the interconnects 199 and 399 may both extend through the same network 999. Each of the interconnects 199 and 399 may be implemented as virtual private networks (VPNs) defined using any of a variety of network security protocols through the network 999. The network 999 may be a single network limited to extending within a single building or other relatively limited area, may include a combination of connected networks extending a considerable distance, and/or may include the Internet. As an alternative to coexisting within the same network 999, the interconnects 199 and 399 may be implemented as entirely physically separate networks. By way of example, the client interconnect 199 may extend through the Internet to enable the client devices 100 to be positioned at geographically diverse locations, while the inter-cluster interconnect 399 may extend through a leased line between the two geographically distant locations at which each of the clusters 1300*a* and 1300*z* are positioned.

As depicted, the partnered nodes within each of the HA groups 1600*ab*, 1600*cd* and 1600*yz* may be additionally coupled via HA interconnects 699*ab*, 699*cd* and 699*yz*, respectively. As also depicted, the nodes within each of the HA groups 1600*ab*, 1600*cd* and 1600*yz* may be coupled to the sets of storage devices 800*ab*, 800*cd* and 800*yz* in a manner enabling shared access via storage interconnects 899*ab*, 899*cd* and 899*yz*, respectively. The partnered nodes and set of storage devices making up each of the HA groups 1600*ab*, 1600*cd* and 1600*yz* may be positioned within relatively close physical proximity to each other such that the interconnects 699*ab*, 899*ab*, 699*cd*, 899*cd*, 699*yz* and 899*yz* may each traverse a relatively short distance (e.g., extending within a room and/or within a cabinet).

More broadly, the network 999 and/or one or more of the interconnects 199, 399, 699*ab*, 699*cd* and 699*yz* may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Each of the interconnects 899*ab*, 899*cd* and 899*yz* may be based on any of a variety of widely known and used storage interface standards, including and not limited to, SCSI, serially-attached SCSI (SAS), Fibre Channel, etc.

It should be noted that despite the depiction of specific quantities of clusters and nodes within the storage cluster system 1000, other embodiments are possible that incorporate different quantities of clusters and nodes. Similarly, despite the depiction of specific quantities of HA groups and nodes within each of the clusters 1300*a* and 1300*z*, other embodiments are possible that incorporate differing quantities of HA groups and nodes. Further, although each of the HA groups 1600*ab*, 1600*cd* and 1600*yz* is depicted as incorporating a pair of nodes 300*a-b*, 300*c-d* and 300*y-z*, respectively, other embodiments are possible in which one or more of the HA groups 1600*ab*, 1600*cd* and 1600*yz* may incorporate more than two nodes.

Figure 2A:
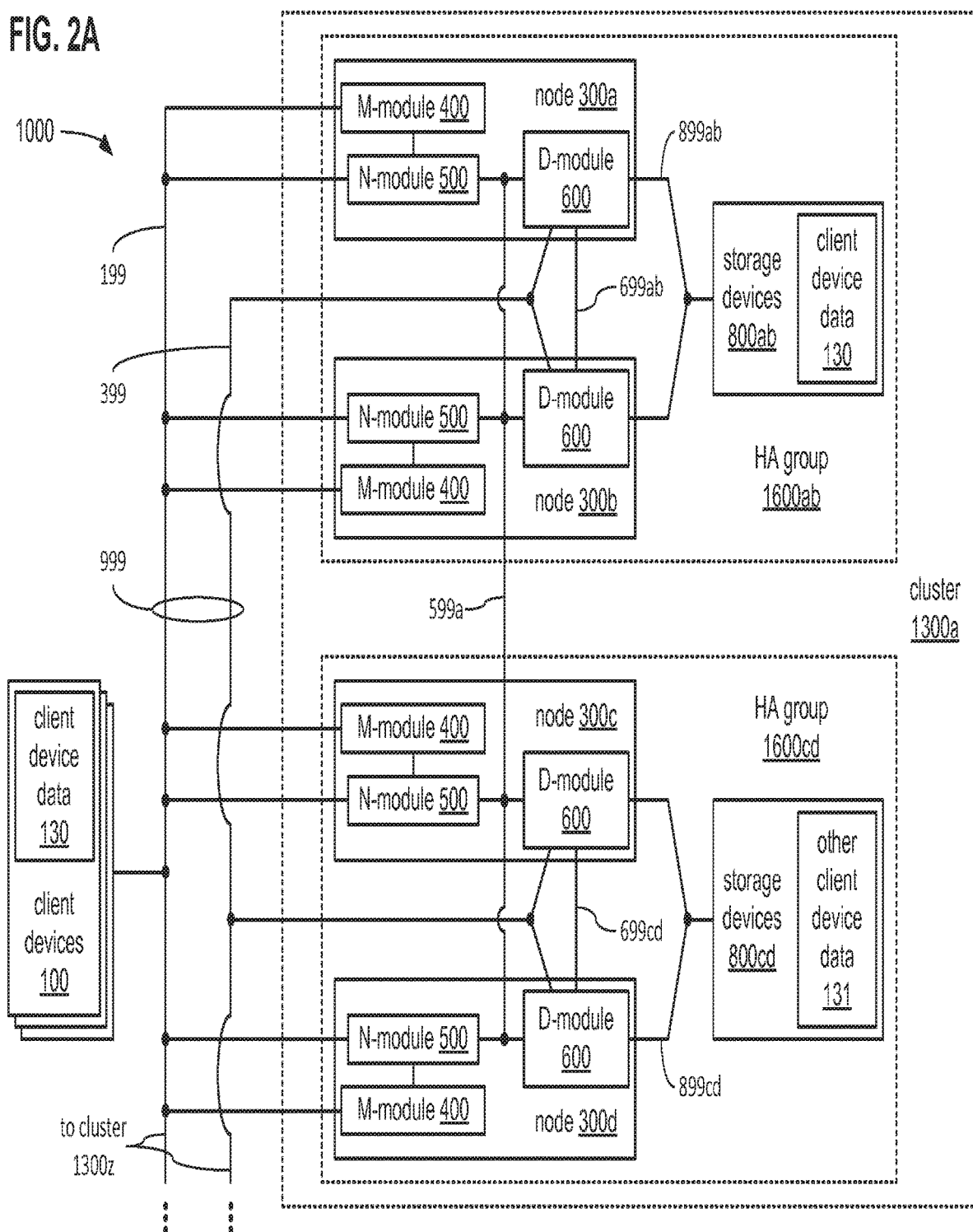
FIG. 2A illustrates an example embodiment of a pair of high availability groups of a cluster.
Figure 2B:
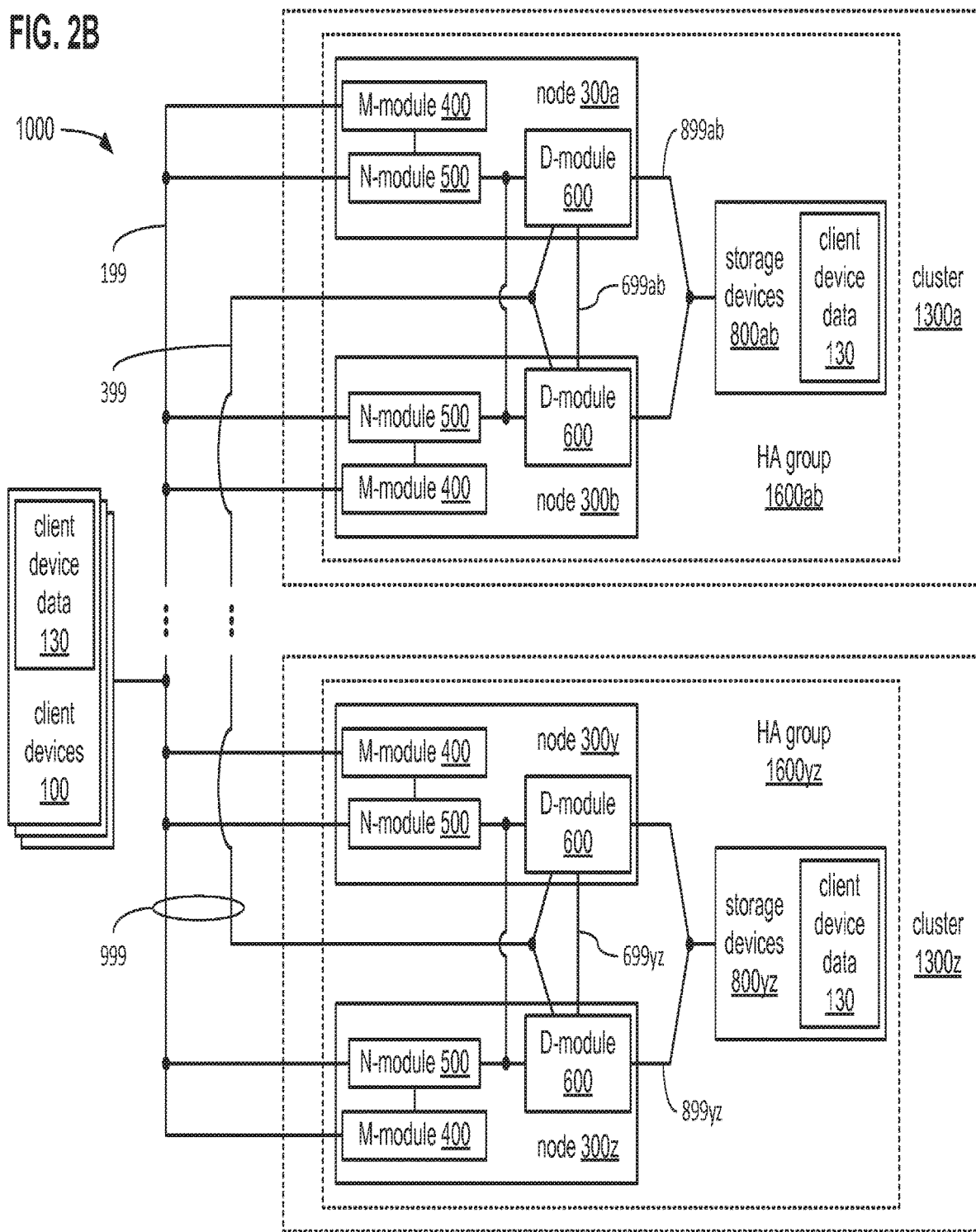
FIG. 2B illustrates an example embodiment of a pair of high availability groups of different clusters.

FIGS. 2A and 2B each illustrate a block diagram of an example portion of the storage cluster system 1000 in greater detail. More specifically, FIG. 2A depicts aspects of the nodes 300*a-d* and interconnections thereamong within the cluster 1300*a* in greater detail. FIG. 2B depicts aspects of the interconnections among the nodes 300*a-b* and 300*y-z*, including interconnections extending between the clusters 1300*a* and 1300*z*, in greater detail.

Referring to both FIGS. 2A and 2B, each of the nodes 300*a-d* and 300*y-z* may incorporate one or more of a M-module 400, a N-module 500 and a D-module 600. As depicted, each of the M-modules 400 and the N-modules 500 may be coupled to the client interconnect 199, by which each may be accessible to one or more of the client devices 100. The M-module 400 of one or more active ones of the nodes 300*a-d* and 300*y-z* may cooperate with one or more of the client devices 100 via the client interconnect 199 to allow an operator of one of the client devices 100 to configure various aspects of the manner in which the storage cluster system 1000 stores and provides access to the client device data 130 provided by one or more of the client devices 100. The N-module 500 of one or more active ones of the nodes 300*a-d* and 300*y-z* may receive and respond to requests for storage services received from one or more of the client devices 100 via the client interconnect 199, and may perform a protocol conversion to translate each storage service request into one or more data access commands.

As depicted, the D-modules 600 of all of the nodes 300*a-d* and 300*y-z* may be coupled to each other via the inter-cluster interconnect 399. Also, within each of the HA groups 1600*ab*, 1600*cd* and 1600*yz*, D-modules 600 of partnered nodes may share couplings to the sets of storage devices 800*ab*, 800*cd* and 800*yz*, respectively. More specifically, the D-modules 600 of the partnered nodes 300*a* and 300*b* may both be coupled to the set of storage devices 800*ab* via the storage interconnect 899*ab*, the D-modules 600 of the partnered nodes 300*c* and 300*d* may both be coupled to the set of storage devices 800*cd* via the storage interconnect 899*cd*, and the D-modules 600 of the nodes partnered 300*y* and 300*z* may both be coupled to the set of storage devices 800*yz* via the storage interconnect 899*yz*. The D-modules 600 of active ones of the nodes 300*a-d* and 300*y-z* may perform the data access commands derived by one or more of the N-modules 500 of these nodes from translating storage service requests received from one or more of the client devices 100.

Thus, the D-modules 600 of active ones of the nodes 300*a-d* and 300*y-z* may access corresponding ones of the sets of storage devices 800*ab*, 800*cd* and 800*yz* via corresponding ones of the storage interconnects 899*ab*, 899*cd* and 899*yz* to store and/or retrieve client device data 130 as part of performing the data access commands. The data access commands may be accompanied by portions of the client device data 130 to store and/or newer portions of the client device data 130 with which to update the client device data 130 as stored. Alternatively or additionally, the data access commands may specify portions of the client device data 130 to be retrieved from storage for provision back to one or more of the client devices 100.

Further, and referring to FIG. 2B, the D-module 600 of an active one of the nodes 300*a-b* and 300*y-z* of one of the clusters 1300*a* or 1300*z* may replicate the data access commands and transmit the resulting replica data access commands via the inter-cluster interconnect 399 to another active one of the nodes 300*a-b* and 300*y-z* of the other of the clusters 1300*a* or 1300*z* to enable at least partial parallel performance of the data access commands by two of the D-modules 600. In this way, the state of the client device data 130 as stored within one of the sets of storage devices 800*ab* or 800*yz* may be mirrored within another of the sets of storage devices 800*ab* or 800*yz*, as depicted.

Such mirroring of the state of the client device data 130 between multiple sets of storage devices associated with different clusters that may be geographically distant from each other may be deemed desirable to address the possibility of the nodes of one of the clusters becoming inaccessible as a result of a regional failure of the client interconnect 199 (e.g., as a result of a failure of a portion of the network 999 through which a portion of the client interconnect extends in a particular geographic region). As familiar to those skilled in the art, the use of additional interconnect(s) between partnered nodes of a HA group (e.g., the HA interconnects 699*ab*, 699*cd* and 699*yz*) tends to encourage physically locating partnered nodes of a HA group in close proximity to each other such that a localized failure of a network may render all nodes of a HA group inaccessible to the client devices 100. For example, a failure of a portion of a network that includes the client interconnect 199 in the vicinity of both of the nodes 300*a* and 300*b* may render both of the nodes 300*a* and 300*b* inaccessible to the client devices 100 such that the client device data 130 stored within the sets of storage devices 800*ab* becomes inaccessible through either of the nodes 300*a* or 300*b*. With both of the sets of the storage devices 800*ab* and 800*yz* mirroring the state of the client device data 130, the client devices 100 are still able to access the client device data 130 within the set of storage devices 800*yz*, despite the loss of access to the set of storage devices 800*ab*.

Referring again to both FIGS. 2A and 2B, and as previously discussed, the sharing of access via the storage interconnects 899*ab*, 899*cd* and 899*yz* to each of the sets of storage devices 800*ab*, 800*cd* and 800*yz*, respectively, among partnered ones of the nodes 300*a-d* and 300*y-z* may enable continued access to one of the sets of storage devices

800ab, 800cd and 800yz in the event of a failure occurring within one of the nodes 300a-d and 300y-z. As depicted, in support of enabling such continued access in spite of such a failure, D-modules 600 of partnered ones of the nodes 300a-d and 300y-z may be coupled within each of the HA groups 1600ab, 1600cd and 1600yz via the HA interconnects 699ab, 699cd and 699yz, respectively. Through the HA interconnects 699ab, 699cd or 699yz, D-modules 600 of each of these nodes may each monitor the status of the D-modules 600 their partners. More specifically, the D-modules 600 of the partnered nodes 300a and 300b may monitor each other through the HA interconnect 699ab, the D-modules 600 of the partnered nodes 300c and 300d may monitor each other through the HA interconnect 699cd, and the D-modules 600 of the partnered nodes 300y and 300z may monitor each other through the HA interconnect 699yz.

Such monitoring may entail recurring exchanges of "heartbeat" and/or other status signals (e.g., messages conveying the current state of performance of a data access command) via one or more of the HA interconnects 699ab, 699cd or 699yz in which an instance of an absence of receipt of such a signal within a specified recurring interval may be taken as an indication of a failure of the one of the D-modules 600 from which the signal was expected. Alternatively or additionally, such monitoring may entail awaiting an indication from a monitored one of the D-modules 600 that a failure of another component of one of the nodes 300a-d or 300y-z has occurred, such as a failure of a M-module 400 and/or of a N-module 500 of that one of the nodes 300a-d or 300y-z. In response to such an indication of failure of an active one of the nodes 300a-d or 300y-z belonging to one of the HA groups 1600ab, 1600cd or 1600yz, an inactive partner among the nodes 300a-d or 300y-z of the same one of the HA groups 1600ab, 1600cd or 1600yz may take over. Such a "takeover" between partnered ones of the nodes 300a-d or 300y-z may be a complete takeover inasmuch as the partner that is taking over may take over performance of all of the functions that were performed by the failing one of these nodes.

However, in some embodiments, at least the N-modules 500 and the D-modules 600 of multiple ones of the nodes 300a-d and/or 300y-z may be interconnected in a manner enabling a partial takeover in response to the failure of a portion of one of the nodes 300a-d or 300y-z. Referring more specifically to FIG. 2A, the N-modules 500 of each of the nodes 300a-d may be coupled to the D-modules 600 of each of the nodes 300a-d via an intra-cluster interconnect 599a. In other words, within the cluster 1300a, all of the N-modules 500 and all of the D-modules 600 may be coupled to enable data access commands to be exchanged between N-modules 500 and D-modules 600 of different ones of the nodes 300a-d. Thus, by way of example, where the N-module 500 of the node 300a has failed, but the D-module 600 of the node 300a is still operable, the N-module 500 of its partner node 300b (or of one of the nodes 300c or 300d with which the node 300a is not partnered in a HA group) may take over for the N-module 500 of the node 300a.

Although the clusters 1300a and 1300z may be geographically distant from each other, within each of the clusters 1300a and 1300z, nodes and/or components of nodes may be positioned within relatively close physical proximity to each other such that the intra-cluster interconnects 599a and 599z may each traverse a relatively short distance (e.g., extending within a room and/or within a single cabinet). More broadly, one or more of the intra-cluster interconnects 599a and 599z may be based on any of a variety (or combination) of communications technologies by which signals may be exchanged, including without limitation, wired technologies employing electrically and/or optically conductive cabling, and wireless technologies employing infrared, radio frequency or other forms of wireless transmission. By way of example, the intra-cluster interconnect 599a may be made up of a mesh of point-to-point interconnects coupling each N-module 500 of each of the nodes 300a-d to each D-module 600 of each of the nodes 300a-d. Alternatively, by way of another example, the intra-cluster interconnect 599a may include a network switch (not shown) to which each of the N-modules 500 and each of the D-modules 600 of the nodes 300a-d may be coupled.

It should be noted, however, that it may be deemed desirable to disallow (or at least limit instances of) such partial takeovers in favor of complete takeovers in which one node takes over all functions of another node in which a failure has occurred. This may be the result of portions of the intra-cluster interconnects 599a and/or 599z that extend between N-modules 500 and D-modules 600 within one or more of the nodes 300a-d and/or 300y-z having the capability to transfer commands and/or data significantly more quickly than portions of the intra-cluster interconnects 599a and/or 599z that extend between N-modules 500 and D-modules 600 of different nodes. Thus, in some embodiments, portions of the intra-cluster interconnects 599a and/or 599z that extend between different ones of the nodes 300a-d or 300y-z, respectively, may not be used such that remain inactive.

It should also be noted that despite the depiction of only a single one of each of the M-module 400, the N-module 500 and the D-module 600 within each of the nodes 300a-d and 300y-z, other embodiments are possible that may incorporate different quantities of one or more of the M-module 400, the N-module 500 and the D-module 600 within one or more of these nodes. By way of example, embodiments are possible in which one or more of the nodes 300a-d and/or 300y-z incorporate more than one N-module 500 to provide a degree of fault-tolerance within a node for communications with one or more of the client devices 100, and/or incorporate more than one D-module 600 to provide a degree of fault-tolerance within a node for accessing a corresponding one of the sets of storage devices 800ab, 800cd or 800yz.

Figure 3:
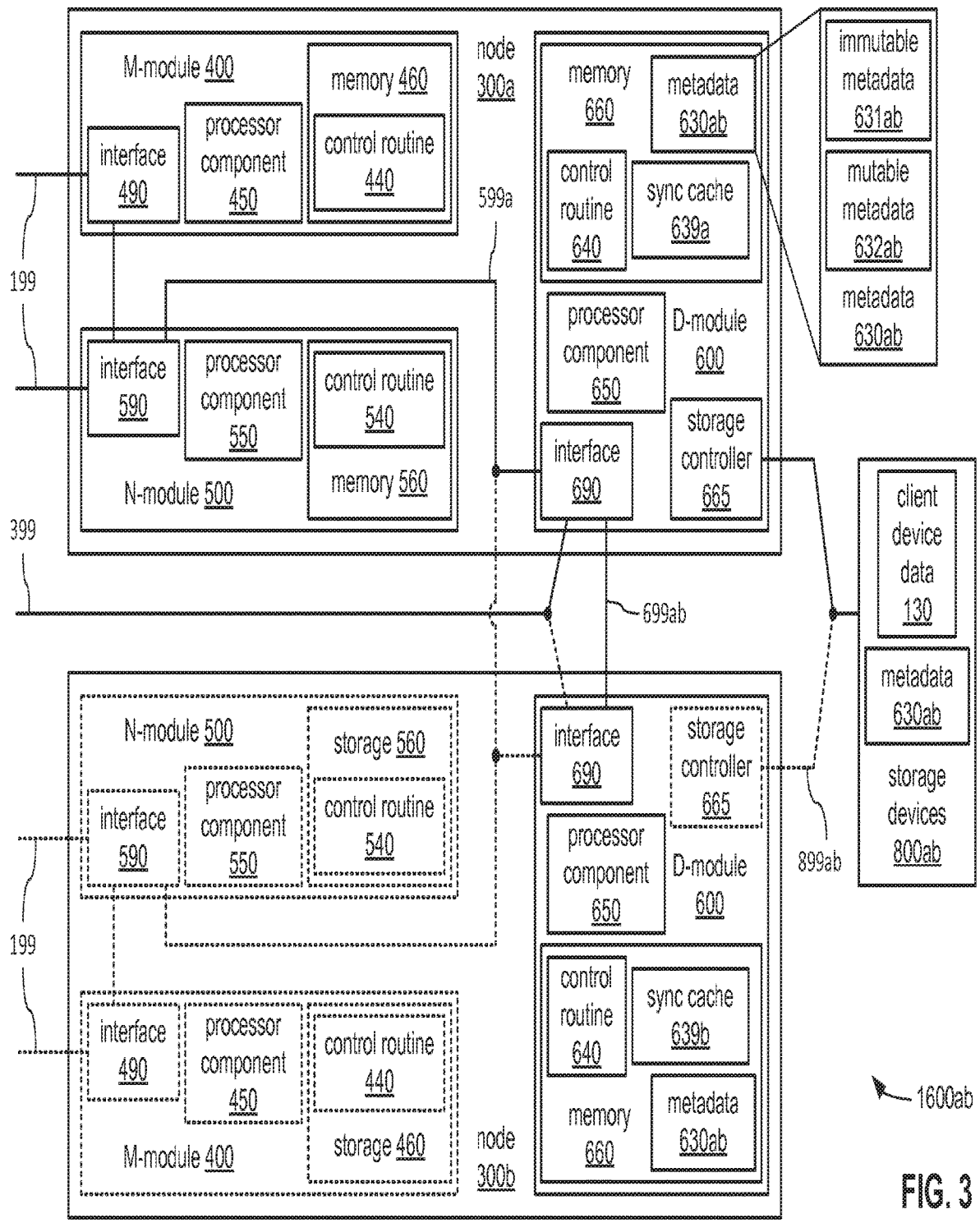
FIG. 3 illustrates an example embodiment of a HA group of partnered nodes.

FIG. 3 illustrates a block diagram of an example embodiment of the HA group 1600ab of the cluster 1300a of the storage cluster system 1000 in greater detail. As depicted, of the nodes 300a and 300b of the HA group 1600ab, the node 300a may be active to engage in communications with a client device 100 and perform operations altering the client device data 130 within the set of storage devices 800ab, while the node 300b may be inactive and awaiting a need to take over for the node 300a. More specifically, the M-module 400 and the N-module 500 may not engage in communications with the client devices 100 (as indicated with the M-module 400 and the N-module 500 being drawn with dotted lines). As also depicted, each of the nodes 300a-b may incorporate one or more of a M-module 400, a N-module 500 and a D-module 600.

In various embodiments, the M-module 400 of each of the nodes 300a-b incorporates one or more of a processor component 450, a memory 460 and an interface 490 to couple the M-module 400 to at least the client interconnect 199. The memory 460 may store a control routine 440. The control routine 440 may incorporate a sequence of instructions operative on the processor component 450 in its role as a main processor component of the M-module 400 to implement logic to perform various functions. As a result of the node 300a being active to engage in communications with one or more of the client devices 100 and to perform data access commands, the processor component 450 of the M-module 400 of the node 300a may be active to execute the control routine 440. However, as a result of the node 300b being inactive, the processor component 450 may not be active to execute the control routine 440 within the M-module 400 of the node 300b. However, if the node 300b takes over for the node 300a, then the control routine 440 within the node 300b may begin to be executed, while the control routine 440 within the node 300a may cease to be executed.

In executing the control routine 440, the processor component 450 of the M-module 400 of the active node 300a may operate the interface 490 to accept remotely supplied configuration information. Specifically, the processor component 450 may provide a web server, telnet access, instant messaging and/or other communications service(s) by which aspects of the operation of the node 300a, the HA group 1600ab, the cluster 1300a and/or other components of the storage cluster system 1000 may be remotely configured. In some embodiments, such remote configuration may emanate from one or more of the client devices 100. By way of example, security protocols by which each of the client devices 100 may be authenticated to allow access to the client device data 130 stored within the set of storage devices 800ab may be remotely configured, as well as what protocols may be employed in communications via the client interconnect 199, what file system may be employed in storing client device data 130 within the set of storage devices 800ab, what other one(s) of the nodes 300b-d or 300y-z may be partnered with the node 300a to form the HA group 1600ab, what other node and/or HA group may cooperate with the node 300a and/or the HA group 1600ab to provide further fault tolerance, what network addresses may be allocated to others of the nodes 300a-d and/or 300y-z on various interconnects, etc. As the processor component 450 receives such configuration information and/or subsequent to receiving such information, the processor component 450 may operate the interface 490 to relay it and/or updates thereto to the N-module 500 and/or the D-module 600 as a portion of metadata.

In various embodiments, the N-module 500 of each of the nodes 300a-b incorporates one or more of a processor component 550, a memory 560 and an interface 590 to couple the N-module 500 to one or both of the client interconnect 199 and the intra-cluster interconnect 599a. The memory 560 may store a control routine 540. The control routine 540 may incorporate a sequence of instructions operative on the processor component 550 in its role as a main processor component of the N-module 500 to implement logic to perform various functions. As a result of the node 300a being active to engage in communications with one or more of the client devices 100 and to perform data access commands, the processor component 550 of the N-module 500 of the node 300a may be active to execute the control routine 540. However, as a result of the node 300b being inactive, the processor component 550 may not be active to execute the control routine 540 within the N-module of the node 300b. However, if the node 300b takes over for the node 300a, then the control routine 540 within the node 300b may begin to be executed, while the control routine 540 within the node 300a may cease to be executed.

In executing the control routine 540, the processor component 550 of the N-module 500 of the active node 300a may operate the interface 590 to perform various tests to detect other devices with which to communicate and/or assign network addresses by which other devices may be contacted for communication. At least as part of rebooting following being reset or powered on, the processor component 550 may perform various tests on the inter-cluster interconnect 399 and/or the intra-cluster interconnect 599a to determine addresses and/or communications protocols for communicating with one or more components (e.g., M-modules 400, N-modules 500 and/or D-modules 600) of one or more of the nodes 300a-d and/or 300y-z. Alternatively or additionally, in embodiments in which at least a portion of the intra-cluster interconnect 599a supports internet protocol (IP) addressing, the processor component 550 may function in the role of a dynamic host control protocol (DCHP) server to assign such addresses. Also alternatively or additionally, the processor component 550 may receive configuration information from the M-module 400.

In some embodiments, configuration information received from the M-module 400 may be employed by the processor component 550 in performing such tests on the inter-cluster interconnect 399 and/or the intra-cluster interconnect 599a (e.g., the configuration information so received may include a range of IP addresses to be tested). As the processor component 550 performs such tests and/or subsequent to performing such tests, the processor component 550 may operate the interface 590 to relay indications of the results of those tests and/or updates thereto to the D-module 600 as a portion of metadata. Further, as the processor component 550 interacts with one or more of the client devices 100 and/or other devices, the processor component 550 may detect changes in information determined from the performance of various tests, and may operate the interface 590 to provide indications of those changes to the D-module 600 as portions of updated metadata.

In further executing the control routine 540, the processor component 550 may operate the interface 590 to exchange storage service requests, responses thereto and/or client device data 130 with one or more of the client devices 100 via the client interconnect 199. The client devices 100 and the N-module(s) 500 of one or more active ones of the nodes 300a-d and 300y-z may interact with each other via the client interconnect 199 in accordance with a client/server model for the handling of client device data 130. Stated differently, each of the client devices 100 may issue requests for storage services related to the storage of client device data 130 to one or more of the nodes 300a-d and 300y-z that are active to engage in communications with the client devices 100. In so doing, the client devices 100 and the N-module 500 may exchange packets over the client interconnect 199 in which storage service requests may be transmitted to the N-module 500, responses (e.g., indications of status of handling of the requests) may be transmitted to the client devices 100, and client device data 130 may be exchanged therebetween. The exchanged packets may utilize any of a variety of file-based access protocols, including and not limited to, Common Internet File System (CIFS) protocol or Network File System (NFS) protocol, over TCP/IP. Alternatively or additionally, the exchanged packets may utilize any of a variety of block-based access protocols, including and not limited to, Small Computer Systems Interface (SCSI) protocol encapsulated over TCP (iSCSI) and/or SCSI encapsulated over Fibre Channel (FCP).

Also in executing the control routine 540, the processor component 550 may operate the interface 590 to exchange commands and/or data, including client device data 130, with the D-module 600 via the intra-cluster interconnect 599a. Such exchanges of commands and/or data may or may not employ a protocol in which packets are used. In some embodiments, data access commands to effect exchanges of client device data 130 may be exchanged through the intra-cluster interconnect 599a in a manner that may be agnostic of any particular file system that may be selected for use in storing the client device data 130 within the set of storage devices 800ab. More specifically, the manner in which portions of client device data 130 may be referred to in data access commands to store and/or retrieve client device data 130 may entail identification of file names, identification of block identifiers, etc. in a manner meant to be independent of a selection of a file system.

Given the possible differences in protocols and/or other aspects of communications, the processor component 550 may be caused to translate between protocols employed in communications with one or more of the client devices 100 via the client interconnect 199 and protocols employed in communications with the D-module 600 via the intra-cluster interconnect 599a. Alternatively or additionally, one or more of the protocols employed in communications via the client interconnect 199 may employ file and/or block identification in a manner enabling a minimal degree of protocol translation between such communications and communications via the intra-cluster interconnect 599a.

In performing such protocol translations, the processor component 550 may be caused to relay a storage service request from one of the client devices 100 to the D-module 600 as one or more data access commands to store and/or retrieve client device data 130. More specifically, a request received via the client interconnect 199 for storage services to retrieve client device data 130 may be converted into one or more data access commands conveyed to the D-module 600 via the intra-cluster interconnect 599a to retrieve client device data 130 from the set of storage devices 800ab and to provide the client device data 130 to the N-module 500 to be relayed by the N-module 500 back to the requesting one of the client devices 100. Also, a request received via the client interconnect 199 for storage services to store client device data 130 may be converted into one or more data access commands conveyed to the D-module 600 via the intra-cluster interconnect 599a to store the client device data 130 within the set of storage devices 800ab.

In various embodiments, the D-module 600 of each of the nodes 300a-b incorporates one or more of a processor component 650, a memory 660, a storage controller 665 to couple the D-module 600 to the set of storage devices 800ab via the storage interconnect 899ab, and an interface 690 to couple the D-module 600 to one or more of the intra-cluster interconnect 599a, the inter-cluster interconnect 399 and the HA interconnect 699ab. The memory 660 stores one or more of a control routine 640 and metadata 630ab. Also, and as will be explained in greater detail, in the D-module 600 of the node 300a, a portion of the memory 660 may be allocated to serve as a synchronization cache (sync cache) 639a, while a portion of the memory 660 may be similarly allocated to serve as a synchronous cache 639b in the D-module of the node 300b. The control routine 640 incorporates a sequence of instructions operative on the processor component 650 in its role as a main processor component of the D-module 600 to implement logic to perform various functions. However, as a result of the node 300a being active to engage in communications with one or more of the client devices 100 and to perform data access commands, a different portion of the control routine 640 may be executed by the processor component 650 of the D-module 600 of the node 300a from a portion of the control routine 640 that may be executed by the processor component 650 of the D-module of the node 300b. As a result, different logic may be implemented by the executions of different portions of the control routine 640 within each of these D-modules 600.

In executing the control routine 640, the processor component 650 of the D-module 600 of the active node 300a may operate the interface 690 to receive portions of metadata and/or updates thereto from the M-module 400 and/or the N-module 500 via the intra-cluster interconnect 599a. Regardless of whether aspects of the operation of at least the node 300a are remotely configured via the M-module 400 and/or are configured based on the results of tests performed by the N-module 500, the processor component 650 may generate the metadata 630ab from those received metadata portions indicating the resulting configuration of those aspects, and may store the metadata 630ab within the memory 660 for subsequent use by the processor component 650. The processor component 650 may repeat the generation of the metadata 630ab in response to receiving updated portion(s) of metadata from the M-module 400, the N-module 500 and/or other possible sources of updated metadata portions, thereby creating an updated version of the metadata 630ab which the processor component 650 may store within the memory 660 in place of earlier version(s).

Following generation of the metadata 630ab and/or each updated version thereof, the processor component 650 may store the metadata 630ab within the set of storage devices 800ab for later retrieval. During subsequent rebooting of the D-module 600 of the node 300a, the processor component 650 may be caused by its execution of the control routine 640 to access the set of storage devices 800ab to retrieve the metadata 630ab. In this way, the processor component 650 retrieves indications of the manner in which various aspects of the operation of at least the node 300a are to be configured, including aspects of the manner in which the D-module 600 is to operate the set of storage devices 800ab and/or the manner in which the D-module 600 is to interact with other devices (e.g., the M-module 400 or the N-module 500 of the node 300a, and/or the N-module 500 or the D-module 600 of one or more of the other nodes 300b-d or 300y-z). It may be deemed desirable to enable the D-module 600 of the node 300a to obtain information concerning aspects of operation of at least the node 300a as quickly as possible by doing so independently of the M-module 400 and/or the N-module 500.

There may be occasions where multiple components of the node 300a, including more than one of the M-module 400, the N-module 500 and the D-module 600, are caused to reboot, including and not limited to, implementing updates, upgrades, expansions of storage space, repairs, etc. By storing the metadata 630ab within the set of storage devices 800ab for later retrieval following a rebooting of the D-module 600, the need for the D-module 600 to await completion of rebooting of the M-module 400 and/or the N-module 500 before being provided with metadata portions from which to again derive the metadata 630ab is avoided.

Alternatively or additionally, a situation may arise in which the M-module 400 and/or the N-module 500 may become inoperative. By way of example, where more than one of the M-module 400, the N-module 500 and the D-module 600 are rebooted, the M-module 400 and/or the N-module 500 may fail to successfully reboot such that either of the M-module 400 or N-module 500 remain unresponsive to any request from the D-module 600 to provide metadata portions making up the metadata 630ab for an extended period of time. Thus, the ability of the D-module 600 to independently retrieve the metadata 630ab may allow the D-module 600 to still cooperate with N-modules 500 and/or D-modules 600 of one or more of the other nodes 300b-d and/or 300y-z to provide fault-tolerant storage and retrieval of the client device data 130, despite the loss of at least some functionality of the node 300a.

Also following generation of the metadata 630ab and/or each updated version thereof, the processor component 650 of the D-module 600 of the node 300a may operate the interface 690 to transmit a duplicate of the metadata 630ab to the D-module 600 of the inactive node 300b via the HA interconnect 699ab to enable the node 300b to more speedily take over for the active node 300a in response to a failure within the node 300a. In this way, the node 300b is directly provided with the metadata 630ab and/or updated versions thereof to provide information needed by the node 300b to more readily take over communications with one or more client devices, take over communications with one or more others of the nodes 300c-d and/or 300y-z, and/or take over control of and/or access to the set of storage devices 800ab.

In further executing the control routine 640, the processor component 650 of the D-module 600 of the node 300a may operate the set of storage devices 800ab through the storage controller 665 to store and retrieve client device data 130 in response to data access commands to do so received via the intra-cluster interconnect 599a, as has been described. The processor component 650 may operate the interface 690 to receive the data access commands from and/or exchange data (including client device data 130) with the N-module 500 via the intra-cluster interconnect 599a.

In addition to operating the storage controller 665 to execute data access commands to store client device data 130 within the set of storage devices 800ab and/or retrieve client device data 130 therefrom, the processor component 650 of the D-module 600 of the node 300a may also replicate the data access commands and operate the interface 690 to transmit the resulting replica data access commands via the inter-cluster interconnect 399 to a D-module 600 of an active one of the nodes 300y-z of the HA group 1600yz of the other cluster 1300z. As has been discussed, the transmission of such replica data access commands to an active node of another HA group may provide an additional degree of fault tolerance in the storage and/or retrieval of client device data 130 in which the replica data access commands may be performed by an active node of another cluster at least partly in parallel with the performance of the original data access command by the node 300a. Again, the processor component 650 may be caused to retry the transmission of such replica data access commands to either the same active one of the nodes 300y-z within the HA group 1600yz and/or to a different inactive one of the nodes 300y-z within the HA group 1600yz in response to indications of errors in either the receipt or performance of the replica data access commands.

In support of such exchanges of replica data access commands and responses thereto between the D-module 600 of the node 300a and a D-module 600 of an active one of the nodes 300y-z, the processor component 650 of the D-module 600 of the node 300a may employ information included within the metadata 630ab to form an active communications session with the D-module 600 of that other active node through the inter-cluster interconnect 399. The processor component 650 may additionally form an inactive communications session with a D-module of the inactive one of the nodes 300y-z through the inter-cluster interconnect 399 in preparation for retrying a transmission of a replica data access command to the D-module 600 of that inactive node. Further, if the processor 650 retries the transmission of a replica data access command to the D-module 600 of that inactive one node, then the processor component 650 may act to change the state of the inactive communications session formed with the D-module 600 of that inactive node from inactive to active.

In executing the control routine 640, the processor component 650 of the D-module 600 of the inactive node 300b may operate the interface 690 to receive the metadata 630ab and/or updates thereto from the D-module 600 of the node 300a via the HA interconnect 699ab. The processor component 650 may then store the received metadata 630ab and/or the received updates thereto within the memory 660 for subsequent use. Again, provision of the metadata 630ab and updates thereto to the node 300b by the node 300a may be deemed desirable to enable the node 300b to more quickly take over for the node 300a (thereby transitioning from being an inactive node of the HA group 1600ab to becoming the active node of the HA group 1600ab) in response to a failure occurring within the node 300a. More specifically, with the metadata 630ab already provided to the D-module 600 of the node 300b, the need for the processor component 650 of the D-module 600 of the node 300b to take additional time to retrieve the metadata 630ab from other sources is alleviated. More precisely, the need for the processor component to retrieve the metadata 630ab from the set of storage devices 800ab, or to request portions of metadata from the M-module 400 and/or the N-module 500 of either of the nodes 300a or 300b upon taking over for the node 300a is alleviated.

As depicted, the metadata 630ab may include immutable metadata 631ab and mutable metadata 632ab. What pieces of metadata are included in each of the immutable metadata 631ab and the mutable metadata 632ab may be based on the relative frequency with which each piece of metadata is expected to change. By way of example, aspects of the storage of client device data 130 within the set of storage devices 800ab, such as a selection of file system, a RAID level, etc. may be deemed immutable as a result of being deemed less likely to change or likely to change less frequently than other metadata. In contrast, a network address of a M-module, a N-module or a D-module of one of the other nodes 300a-d or 300y-z with which the node 300a may communicate via one of the interconnects 399, 599a or 699ab may be deemed mutable as a result of being deemed more likely to change or likely to change more frequently than other metadata.

Since the mutable metadata 632ab includes indications of aspects of the operation of at least the node 300a that are deemed likely to change with greater frequency than similar indications included in the immutable metadata 631ab, the information included in at least the mutable metadata 632ab may more frequently become out of date. Following rebooting of the D-module 600 of the node 300a, if an attempt by the processor component 650 to employ information in the mutable metadata 632ab obtained from the storage devices 800ab to communicate with other components of the node 300a and/or with components of others of the nodes 300b-d and/or 300y-z is unsuccessful, then the processor component 650 may operate the interface 690 to transmit a request to the M-module 400 and/or the N-module 500 via the intra-cluster interconnect 599a for metadata portions that include updated versions of the information included in the mutable metadata 632ab. Depending on whether the M-module 400 and/or the N-module 500 are also rebooting, the processor component 650 may be caused to await completion of their rebooting and to then retransmit its request for those updated metadata portions. In response to receiving the request, the processor components 450 and/or 550 may be caused by execution of the control routines 440 and/or 540 to operate the interfaces 490 and/or 590, respectively, to transmit such updated metadata portions to the D-module 600 via the intra-cluster interconnect 599a. Upon receiving the updated information, the processor component 650 may then incorporate the updated information into the mutable metadata 632ab, again generate the metadata 630ab incorporating the updated mutable metadata 632ab, store the now updated metadata 630ab within the memory 660 and the set of storage devices 800ab, and employ the now updated metadata 630ab within the memory 660 to operate the interface 690 to make another attempt to communicate with other components of the node 300a and/or with components of others of the nodes 300b-d and/or 300y-z.

In some embodiments, if the attempt by the processor component 650 to communicate using the metadata 630ab incorporating the now updated mutable metadata 632ab is also unsuccessful, then the processor component 650 may operate the interface 690 to transmit a request to the M-module 400 and/or the N-module 500 for updated versions of the information making up the immutable metadata 631ab. It may be that an updated version of the immutable metadata 631ab includes indications of aspects of operation that are needed in conjunction with using the information contained within the updated version of the mutable metadata 632ab. Upon receiving the updated information, the processor component 650 may then incorporate the updated information into the immutable metadata 631ab, again generate the metadata 630ab incorporating the updated immutable metadata 631ab, store the now updated metadata 630ab within the memory 660 and the set of storage devices 800ab, and employ the now updated metadata 630ab to make a further attempt to communicate with other components of the node 300a and/or with components of others of the nodes 300b-d and/or 300y-z.

As part of determining whether one of the nodes 300a or 300b needs to take over for the other, the processor components 650 of the D-modules of each of the nodes 300a and 300b may cooperate to recurringly exchange indications of the status of their nodes via the HA interconnect 699ab extending therebetween. As previously discussed such exchanges of status indications may take the form of recurring "heartbeat" signals and/or indications of the current state of performing an operation (e.g., a performing a data access command). Again, an indication that a component of one of the nodes 300a-b has suffered a malfunction may be the lack of receipt of an expected heartbeat signal or other status indication by the other of the nodes 300a-b within a specified period of time (e.g., within a recurring interval of time). Where the D-module 600 of the active node 300a receives an indication of a failure within the inactive node 300b, the processor component 650 of the D-module 600 of the node 300a (or another component of the node 300a) may refrain from taking action to take over the node 300b, since the node 300b is inactive such that the node 300b may not be performing a task that requires a takeover of the node 300b.

However, where the D-module 600 of the inactive node 300b receives an indication of a failure within the active node 300a, the processor component 650 of the D-module 600 of the inactive node 300b (or another component of the inactive node 300b) may take action to take over the node 300a, since the node 300a is active to engage in communications with the client devices 100, to perform data access commands, and to cooperate with another active node to cause at least partial parallel performance of data access commands therebetween. By way of example, the processor component 650 of the D-module 600 of the node 300b may signal the N-module 500 of the node 300b to take over communications with one or more of the client devices 100 and/or may begin performing the data access commands that were performed by the processor component 650 of the D-module 600 of the node 300a. In taking over the performance of those data access commands, the processor component 650 of the D-module 600 of the node 300b may take over access to and control of the set of storage devices 800ab via the coupling that the D-modules 600 of both of the nodes 300a and 300b share to the set of storage devices 800ab through the storage interconnect 899ab.

Where the inactive node 300b does take over for the active node 300a in response to a failure occurring within the node 300a, the active and inactive roles of the nodes 300a and 300b may fully reverse, at least after the failure within the node 300a has been corrected. More specifically, the M-module 400 and the N-module 500 of the node 300b may become active to engage in communications with the client devices 100 via the client interconnect 199 to receive configuration information and storage service requests, and thereby take over for the M-module 400 and the N-module 500 of the node 300a, while the M-module 400 and the N-module 500 of the node 300a become inactive. Similarly, the D-module 600 of the node 300b may become active to perform and replicate data access commands, and to transmit replica data access commands to another active node via the inter-cluster interconnect 399 to cause at least partial parallel performance of the data access commands, and thereby take over for the D-module 600 of the node 300a, while the D-module 600 of the node 300a becomes inactive. However, in becoming active, the processor component 650 of the D-module 600 of the now inactive node 300a may cooperate with the processor component 650 of the D-module 600 of the node 300b to receive new versions of the metadata 630ab generated within the node 300b and to exchange indications of status with the D-module 600 of the node 300b via the HA interconnect 699ab to determine if the node 300a should subsequently take over for the now active node 300b.

The processor components 650 of the D-modules 600 of each of the nodes 300a and 300b may designate or otherwise use a portion of corresponding ones of the memories 660 as the synchronization caches 639a and 639b, respectively, in communications with D-module(s) 600 of others of the nodes 300a-d and/or 300y-z. More specifically, the processor components 650 of the D-modules 600 of the nodes 300a and 300b may employ the synchronization caches 639a and 639b, respectively, to buffer versions of the metadata 630ab and/or status indications exchanged therebetween. Alternatively or additionally, the processor component 650 of the D-module 600 of the node 300a may maintain and employ the synchronization cache 639a to buffer replica data access commands transmitted to another active node of another HA pair of another cluster and/or indications of status of performance of those replica data access commands received from that other active node.

Broadly, each of the client devices 100, the nodes 300a-d and 300y-z, the M-modules 400, the N-module 500, the D-modules 600 and/or the storage devices 800ab, 800cd and 800yz may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

In some embodiments, one or more of the nodes 300a-d and 300y-z may be physically implemented as an assembly of one or more M-modules 400, one or more N-modules 500 and one or more D-modules 600 that are each implemented as separate computing devices coupled by a physical implementation of a corresponding one of the intra-cluster interconnect 599a or 599z. However, in other embodiments, more than one of the M-module(s) 400, the N-module(s) 500 and D-module(s) 600 of one or more of the nodes 300a-d and 300y-z may be implemented as sets of instructions that are executed as processes by a shared processor component (e.g., one of the processor components 450, 550 or 650). In such other embodiments, at least a portion of the intra-cluster interconnect 599a or 599z that does not extend between nodes may be implemented as a buffer or other data structure defined within a shared memory (e.g., one of the memories 460, 560 or 660) and employed to exchange data access commands, client device data 130 and metadata 630ab among the control routines 440, 540 and/or 640.

In the examples presented herein, one or more of the client devices 100 may be a computing device directly operated by one or more persons to generate and/or work with client device data 130, and one or more of the nodes 300a-d and 300y-z may be a computing device functioning as a server to remotely store such client device data 130, as well as to provide the client devices 100 with access thereto in a fault-tolerant manner. Alternatively or additionally, in examples presented herein, one or more of the client devices 100 may be a computing device functioning as a server to store and provide access to at least a portion of client device data 130, and one or more of the nodes 300a-d and 300y-z may be a computing device functioning as an additional server to augment the storage provided by one or more of the client devices 100.

Figure 4:
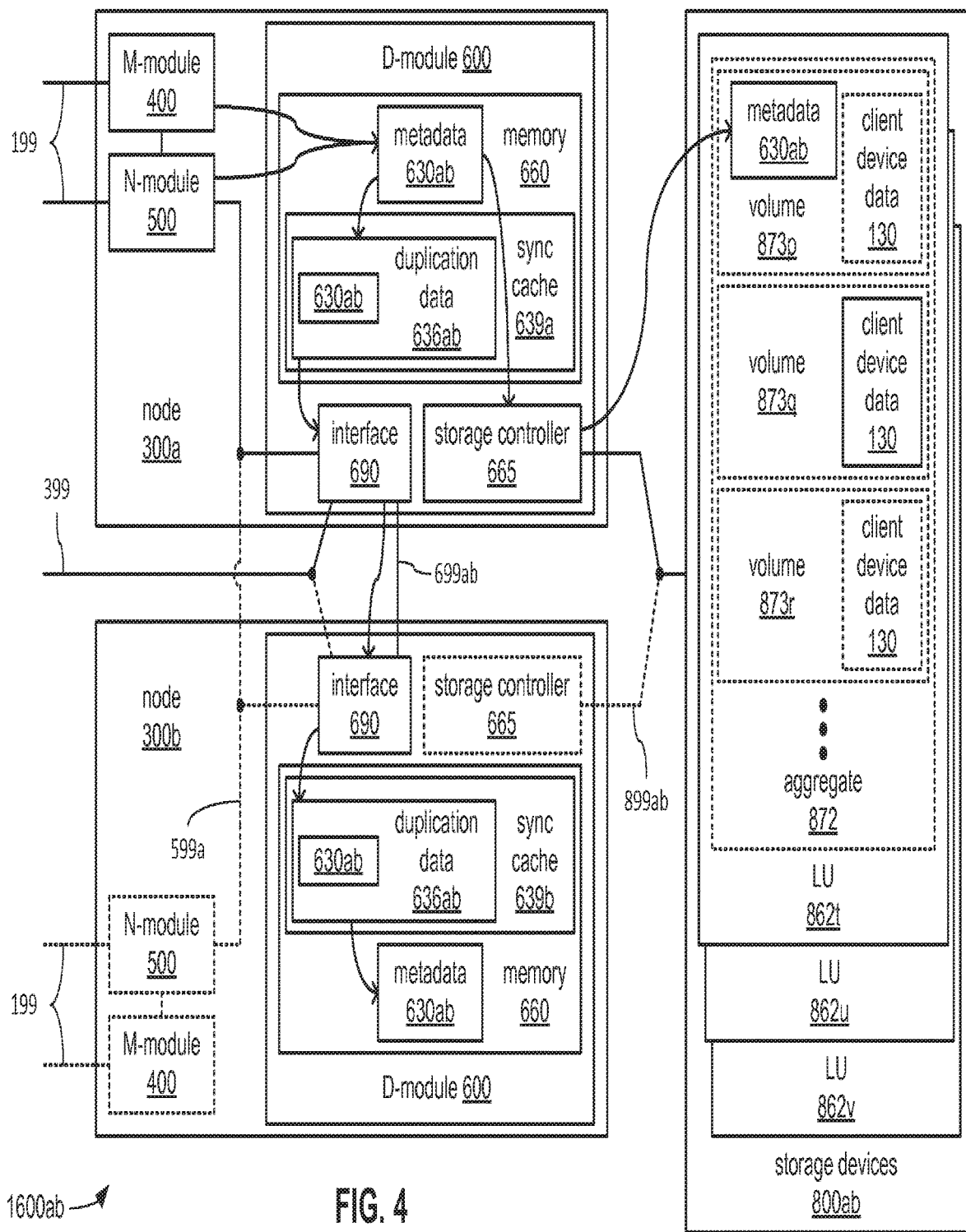
FIG. 4 illustrates an example embodiment of duplication and storage of metadata within a shared set of storage devices.

FIG. 4 illustrates a block diagram of another example embodiment of the HA group 1600ab of the cluster 1300a of the storage cluster system 1000 in greater detail. As again depicted, of the nodes 300a and 300b of the HA group 1600ab, the node 300a may be active to engage in communications with a client device 100 and perform operations altering the client device data 130 within the set of storage devices 800ab, while the node 300b may be inactive and awaiting a need to take over for the node 300a. FIG. 4 also depicts various aspects of the generation, duplication and storage of the metadata 630ab within the set of storage devices 800ab alongside the client device data 130 in greater detail.

Each of the sets of storage devices 800ab, 800cd and 800yz may be made up of storage devices based on any of a variety of storage technologies, including and not limited to, ferromagnetic "hard" or "floppy" drives, magneto-optical media drives, optical media drives, non-volatile solid state drives, etc. As depicted, the set of storage devices 800ab may include LUs 862t-v that may be operated together to form one such array. In some embodiments, the processor component 650 of the D-module 600 of the node 300a may operate the storage controller 665 to treat each of the storage devices of the set of storage devices 800ab as a separate LU and/or may be caused to treat a group of those storage devices as a single LU. Multiple LUs may be operated together via the storage controller 665 to implement a level of RAID or other form of array that imparts fault tolerance in the storage of data therein. The manner in which LUs are defined among one or more storage devices of the set of storage devices 800ab, and/or the manner in which multiple LUs may be operated together may be specified within the metadata 630ab.

The processor component 650 may be caused to allocate storage space in any of a variety of ways within a single LU and/or within multiple LUs operated together to form an array. In so doing, the processor component 650 may be caused to subdivide storage space in any of a variety of ways within a single LU and/or within multiple LUs that are operated together. By way of example, such subdivisions may be effected as part of organizing client device data 130 into separate categories based on subject, as part of separating client device data 130 into different versions generated over time, as part of implementing differing access policies to different pieces of client device data 130, etc. In some embodiments, and as depicted, the storage space provided by within the LU 862t or within a combination of the LUs 862t-v may be designated as an aggregate 872. Further, the aggregate 872 may be subdivided into volumes 873p-r. The manner in which aggregates and/or volumes are defined may be selected to conform to the specification(s) of one or more widely known and used file systems, including and not limited to, Write Anywhere File Layout (WAFL). The manner in which aggregates and/or volumes within aggregates are allocated among a single LU or multiple LUs that are operated together may be specified within the metadata 630ab.

The client device data 130 may be stored entirely within one of the volumes 873p-r, or may be distributed among multiple ones of the volumes 873p-r (as depicted). As also depicted, the metadata 630ab may also be stored within the set of storage devices 800ab along with client device data 130, at least within the same aggregate 872. In some embodiments, the metadata 630ab may be stored within one or more of the same volumes 873p-r as client device data 130 (as depicted). In other embodiments, the metadata 630ab may be stored within one of the volumes 873p-r that is separate from one or more others of the volumes 873p-r within which client device data 130 may be stored. The manner in which the metadata 630ab and/or the client device data 130 are organized within aggregates and/or values may be specified within the metadata 630ab.

As previously discussed, the M-module 400 of the active node 300a may provide portions of metadata, including updates thereof, to the N-module 500 and/or the D-module 600 in response to receiving configuration information from one of the client devices 100. Also, the N-module 500 of the active node 300a may provide portions of metadata, including updates thereof, to the D-module 600 that indicate results of various tests performed by the N-module 500. The metadata 630ab and/or updated versions thereof may be generated from these portions of metadata received by the D-module 600 of the active node 300a, and may then be stored within the memory 660 for subsequent use by the processor component 650 and/or within the set of storage devices 800ab for subsequent retrieval following rebooting of the D-module 600. Alternatively or additionally, a duplicate of the metadata 630ab may be generated and stored within the synchronization cache 639a as a portion of duplication data 636ab, by which the duplicate of the metadata 630ab may be transmitted via the interface 690 and the HA interconnect 699ab to the D-module 600 of the inactive node 300b. Upon receipt via the interface 690 of the D-module 600 of the node 300b, the duplication data 636ab may be stored within the synchronization cache 639b from which the duplicate of the metadata 630ab may be retrieved and stored elsewhere within the memory 660 for subsequent use by the processor component 650 of the D-module 600 of the node 300b.

Figure 5A:
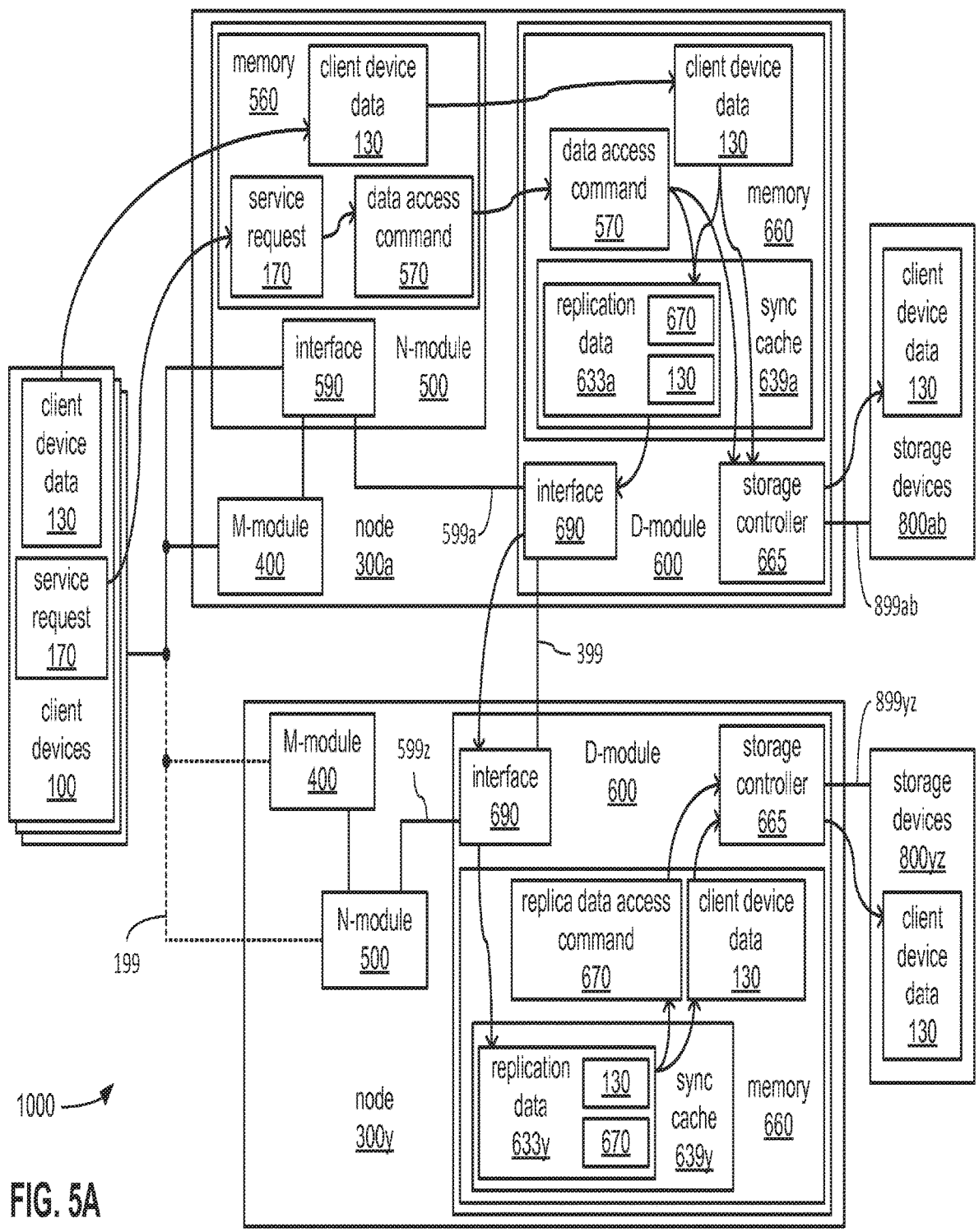
FIG. 5A illustrates an example embodiment of replication of commands between nodes.
Figure 5B:
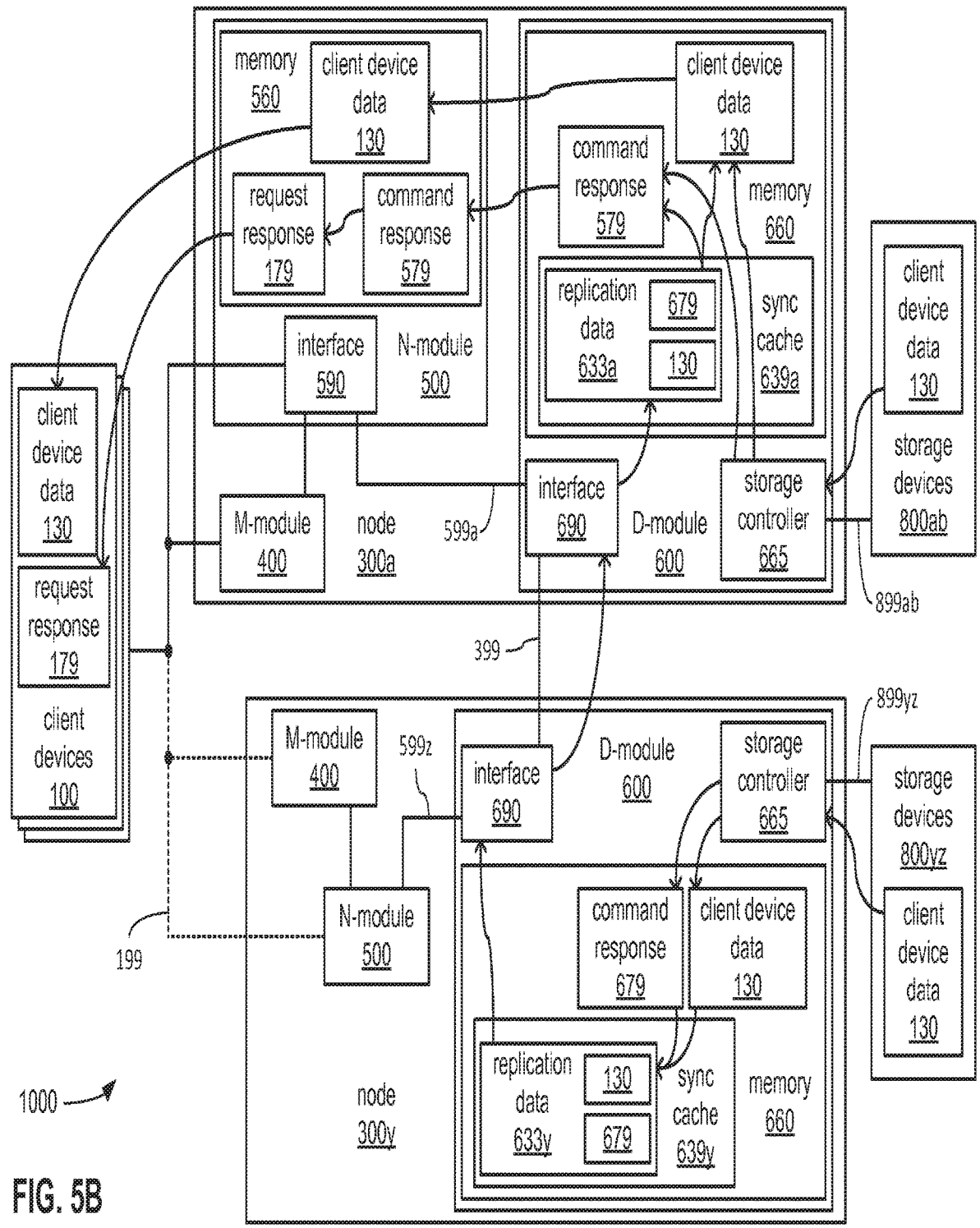
FIG. 5B illustrates an example embodiment of relaying responses to replicated commands between nodes.

FIGS. 5A and 5B both illustrate a block diagram of an example embodiment of the interconnections between active nodes 300a and 300y of the storage cluster system 1000 in greater detail. More specifically, FIG. 5A depicts aspects of replication and at least partial parallel performance of data access commands between the nodes 300a and 300y in greater detail. FIG. 5B depicts aspects of combining and relaying responses generated by such at least partial parallel performance by the nodes 300a and 300y in greater detail. As depicted in both FIGS. 5A and 5B, the node 300a may be active to engage in communications with a client device 100 and to perform data access commands altering the client device data 130 within the set of storage devices 800ab, while the node 300y may be active to engage in communications with the node 300a and to perform replica data access commands altering the client device 130 within the set of storage devices 800yz at least partly in parallel with the node 300a.

Turning to FIG. 5A, as previously discussed, the N-module 500 of the active node 300a may receive client device data 130 and/or storage service requests 170 from one of the client devices 100, which may then be temporarily stored within the memory 560. The storage service requests 170 to store and/or retrieve client device data 130 may then be translated into data access commands 570 to store and/or retrieve client device data 130, respectively. Following such translation and/or as such translation occurs, client device data 130 and/or storage service requests 170 may be relayed to the D-module 600 of the active node 300a, where the client device data 130 and/or the storage service requests 170 may then be temporarily stored within the memory 660 in preparation for being performed by the D-module 600 of the node 300a. However, in addition to such performance, the data access commands 570 may be replicated to generate corresponding replica data access commands 670 that may be stored within the synchronization cache 639a as a portion of replication data 633a. The replication data 633a may serve as a buffer of which the contents are transmitted on a recurring basis to the D-module 600 of the active node 300y via the interface 690 and the inter-cluster interconnect 399. Where the replica data access commands 670 include commands to store a piece of the client device data 130, such a piece may be stored within the synchronization cache 639a as another portion of the replication data 633a to be transmitted to the node 300y along with the replica data access commands 670.

Upon receipt via the interface 690 of the D-module 600 of the node 300y, the recurringly transmitted contents of the replication data 633a may be temporarily stored within the synchronization cache 639y as a portion of the replication data 633y. The received replica data access commands 670 and/or associated pieces of the client device data 130 may then be retrieved from the replication data 633y and temporarily stored elsewhere within the memory 660 in preparation for performance of the replica data access commands 670 by the D-module 600 of the node 300y. The D-module 600 of the node 300y then performs the replica data access commands 670 to store client device data 130 within and/or retrieve client device data 130 from the set of storage devices 800yz at least partly in parallel with the D-module 600 of the node 300a performing the data access commands 570 to similarly store client device data 130 within and/or retrieve client device data 130 from the set of storage devices 800ab.

Turning to FIG. 5B, as the replica data access commands 670 are performed by the D-module 600 of the node 300y, command responses 679 to the performances of those replica data access commands 670 may be generated and may be temporarily stored within the synchronization cache 639y as a portion of the replication data 633y. The command responses 679 may include one or more of indications of successful commencement and/or completion of performance of replica data access commands 670, and/or indications of failure occurring in attempts to perform replica data access commands 670. The replication data 633y may serve as a buffer of which the contents are transmitted on a recurring basis to the D-module 600 of the active node 300a via the interface 690 and the inter-cluster interconnect 399. Where the replica data access commands 670 include commands to retrieve a piece of the client device data 130, such a piece may be stored within the synchronization cache 639y as another portion of the replication data 633y to be transmitted back to the node 300a along with the command responses 679.

Upon receipt via the interface 690 of the D-module 600 of the node 300a, the recurringly transmitted contents of the replication data 633y may be temporarily stored within the synchronization cache 639a as a portion of the replication data 633a. The received command responses 679 and/or associated pieces of the client device data 130 may then be retrieved from the replication data 633a and temporarily stored elsewhere within the memory 660 in preparation for analysis alongside results of performance of the data access commands 570 by the D-module 600 of the node 300a. The D-module 600 of the node 300a then generates command responses 579 from such analysis and relays the command responses 579 and/or associated pieces of data 130 to the N-module 500 of the node 300a where one or both may be temporarily stored within the memory 560. The command responses 579 may then be translated into storage service request responses 179, and then the request responses 179 and/or associated pieces of client device data 130 may be transmitted back to one of the client devices 100.

Figure 6:
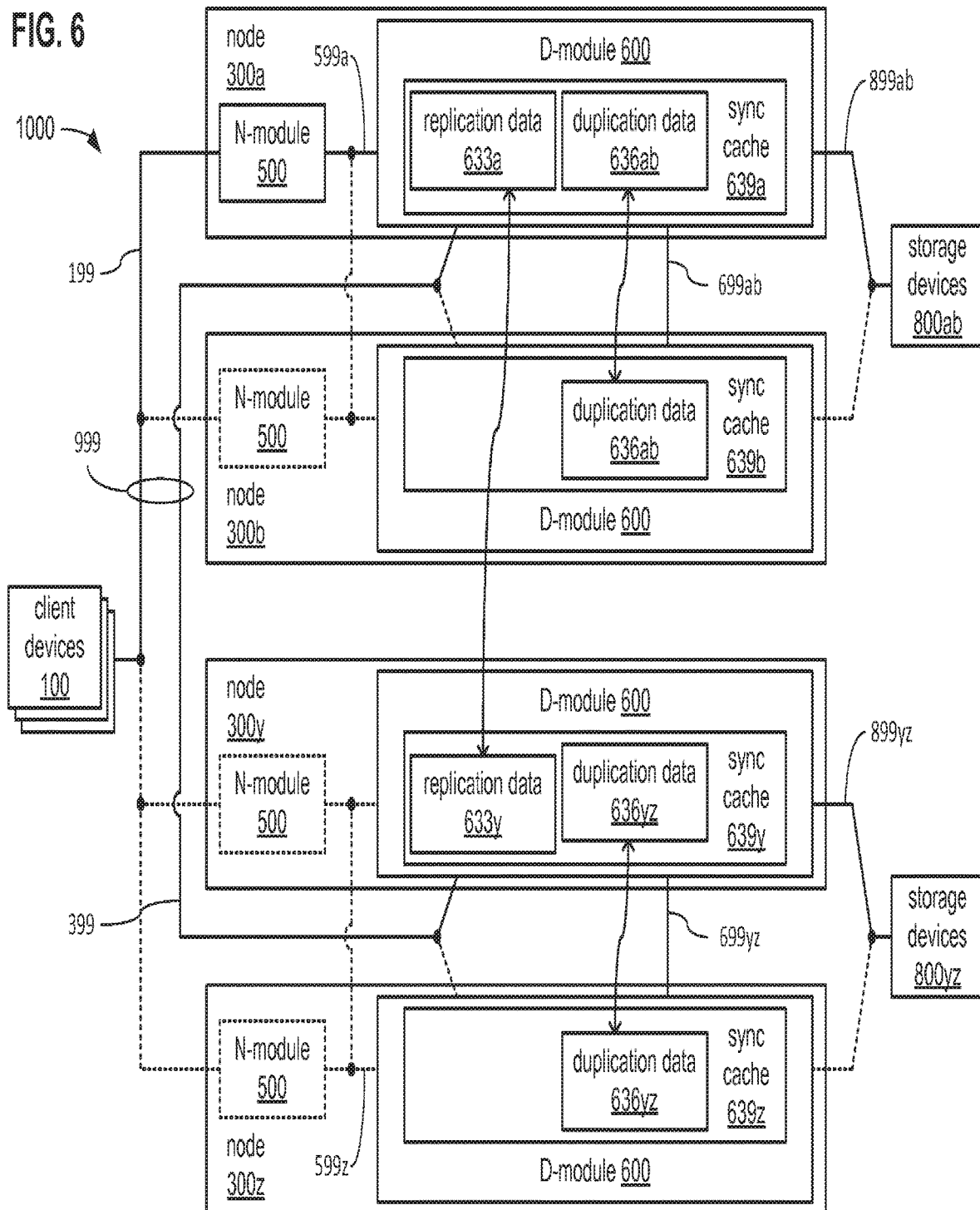
FIG. 6 illustrates an example embodiment of synchronization of commands and metadata among nodes.

FIG. 6 depicts an example embodiment of duplication of metadata within a HA group, and replication of data access commands relating to the client device data 130 between nodes of different HA groups in greater detail. As depicted, the node 300a may be active within the HA group 1600ab to communicate with the client devices 100 via the client interconnect 199 and with node 300y, which may be active within the HA group 1600yz to communicate with the node 300a via the inter-cluster interconnect 399. The nodes 300b and 300z may be inactive as each awaits the need to take over for the nodes 300a or 300y, respectively. The active state of the node 300a for communication with the client devices 100 such that the N-module 500 of the node 300a is in use to do so is indicated by the portions of the client interconnect 199 coupling the node 300a to the client devices 100 being drawn with solid lines, while portions for coupling the nodes 300b and 300y-z to the client interconnect 199 are drawn with dotted lines. The active states of both the nodes 300a and 300y for communication with each other are indicated by the portions of the inter-cluster interconnect 399 coupling the nodes 300a and 300y being drawn with solid lines, while portions for coupling the nodes 300b and 300z to the inter-cluster interconnect 399 are drawn with dotted lines.

As depicted, synchronization caches 639a-b and 639y-z may be formed within the memories 660 of the D-modules 600 of each of the nodes 300a-b and 300y-z, respectively, to enable the duplication of metadata and/or the replication of data access commands described above. As previously discussed, the synchronization caches 639a and 639b may both include the duplication data 636ab as part of enabling cooperation between the D-modules 600 of the partnered nodes 300a and 300b to exchange the metadata 630ab. However, the synchronization caches 639a-b and/or the duplication data 636ab may also be employed in exchanges of status occurring between the D-modules 600 of the nodes 300a and 300b as part of each monitoring the other for indications of failure that may necessitate a takeover of one of the nodes 300a-b by the other. The synchronization caches 639a and 639b may be operated in a manner in which they are functionally linked to provide a portal between the D-modules 600 of the nodes 300a and 300b that may be buffered at both ends of the HA interconnect 699ab. Indications of current status of these D-modules 600 and/or duplicates of versions of the metadata 630ab may be exchanged by writing such indications and/or metadata into the duplication data 636ab of one of the synchronization caches 639a or 639b, and retrieving such indications and/or pieces of metadata from the duplication data 636ab of the other of the synchronization caches 639a or 639b. Stated differently, the contents of the duplication data 636ab may be recurringly "synchronized" between the synchronization caches 639a and 639b.

As also previously discussed, the synchronization cache 639y may include replication data 633y as a counterpart to the replication data 633a within the synchronization cache 639a as part of cooperation between the D-modules 600 of the nodes 300a and 300y to perform data access commands and replicas thereof at least partially in parallel. The replication data 633a and 633y may buffer information conveyed between the D-modules 600 of the nodes 300a and 300y via the inter-cluster interconnect 399. More specifically, indications of current status of the replication of data access commands by the D-module 600 of the node 300a, current status of at least partial parallel performance of the replica data access commands by the D-module 600 of at least the node 300y, and/or current status of communications therebetween concerning the replica data access commands may be maintained as part of the replication data 633a. Alternatively or additionally, replica data access commands transmitted to the D-module 600 of the node 300y, portions of client device data 130 conveyed with those replica data access commands and/or in response to those replica data access commands may also be maintained as part of the replication data 633a. Correspondingly, the replica data access commands received by the D-module 600 of the node 300y via the inter-cluster interconnect 399 from the D-module 600 of the node 300a may be buffered within the replication data 633y, along with any client device data 130 that accompanies those replica data access commands and/or responses thereto. Indications of the current status of performance of those replica data access commands by the D-module 600 of the node 300y may also be buffered within the replication data 633y before being transmitted to the D-module 600 of the node 300a.

As further depicted, the synchronization caches 639y and 639z may include duplication data 636yz as part of enabling cooperation between the D-modules 600 of the partnered nodes 300y and 300z to exchange status indications and duplicates of metadata therebetween in much the same manner as described above between the D-modules 600 of the nodes 300a and 300b. Stated differently, the D-modules 600 of the nodes 300y and 300z may cooperate to recurringly exchange status indications (e.g., "heartbeat" signals and/or status of performing various operations) therebetween via the HA interconnect 699yz as part of each monitoring the other for indications of failure in a manner not unlike that in which the partnered nodes 300a and 300b exchange signals via the HA interconnect 699ab to monitor each other. Further, the D-module 600 of the active node 300y may transmit versions of metadata to the D-module of the inactive node 300z via the HA interconnect 699yz in a manner not unlike that in which the partnered nodes 300a and 300b exchange versions of metadata, in addition to storing such versions within the set of storage devices 800yz. It should be noted that the metadata used by and exchanged between the nodes 300y and 300z may be at least partly different from the metadata 630ab used by and exchanged between the nodes 300a and 300b. This may arise at least partly due to the nodes 300a-b and the nodes 300y-z belonging to different HA groups and/or belonging to different clusters.

Figure 7:
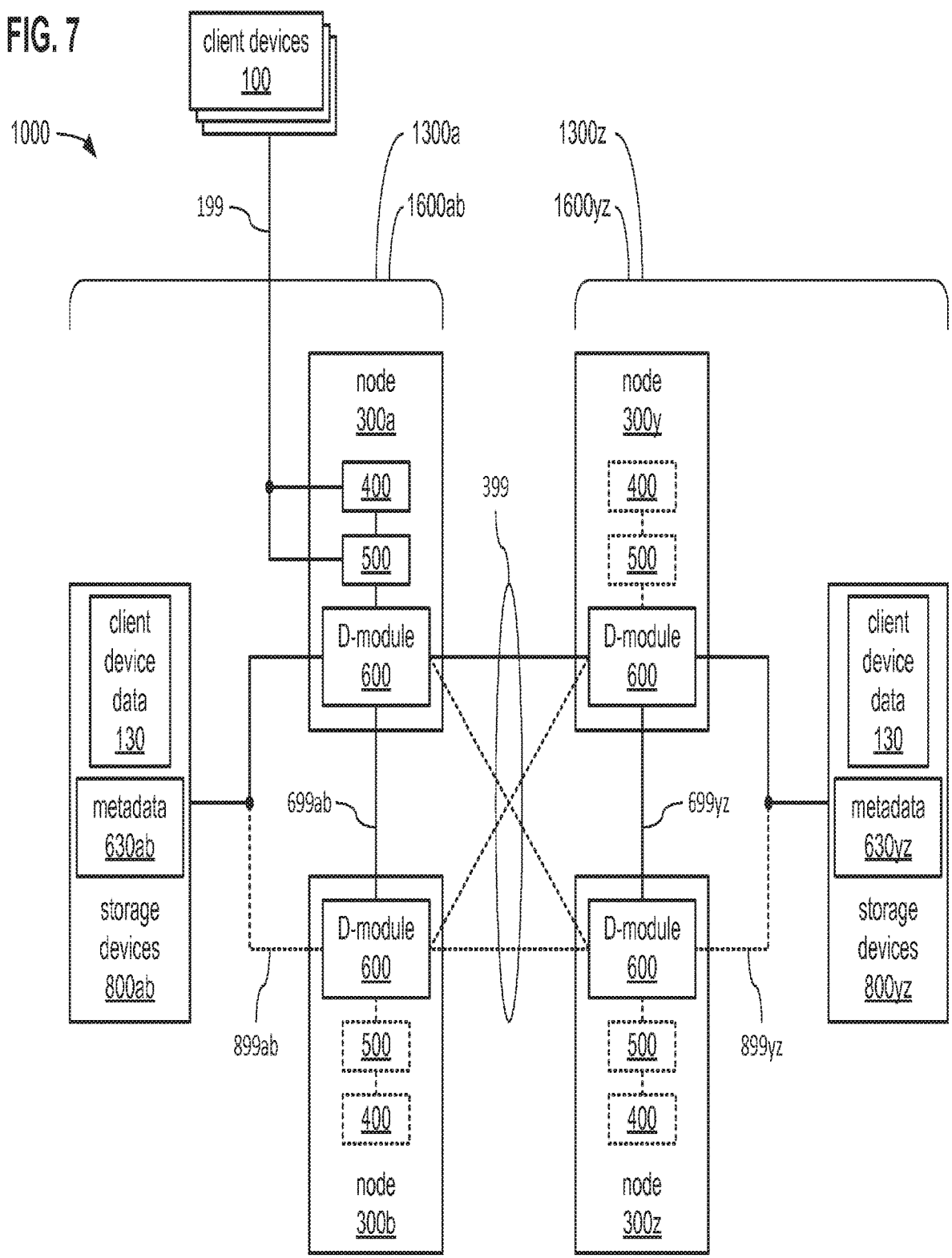
FIG. 7 illustrates an example embodiment of a mesh of communications sessions among nodes.

FIG. 7 depicts an example embodiment of a mesh of communications sessions formed among the nodes 300a-b and 300y-z through the inter-cluster interconnect 399 in greater detail. More specifically, through the inter-cluster interconnect 399, each of the nodes 300a and 300b of the HA group 1600ab forms a communications session with each of the nodes 300y and 300z of the HA group 1600yz, thereby forming the depicted mesh of communications sessions among the nodes 300a-b and 300y-z. As depicted, of these communications sessions, the communications session extending between the nodes 300a and 300y may be an active communications session (as indicated with a solid line), while the others of these communications sessions may be inactive communications sessions (as indicated with dotted lines). This reflects the fact that the nodes 300a and 300y, at least initially, are each the active nodes of the HA groups 1600ab and 1600yz, respectively, that engage in communications to exchange replica data access commands and associated data to enable at least partly parallel performance of data access commands between the HA groups 1600ab and 1600yz.

Thus, during normal operation of the storage cluster system 1000 in which the nodes 300a and 300y are active nodes and no errors occur within either of the nodes 300a or 300y, a request for storage services is received by the node 300a via the client interconnect 199 from one of the client devices 100. Following conversion of the storage services request into a data access command by the N-module 500 of the node 300a, the D-module 600 of the node 300a may both begin performance of the data access command and transmit a replica of that data access command to the node 300y via the active communications session formed through inter-cluster interconnect 399 between the nodes 300a and 300y. The D-module 600 of the node 300y may then perform the replica data access command at least partly in parallel with the performance of the data access command by the D-module 600 of the node 300a.

In preparation for such a transmission, the D-module 600 of the node 300a may cooperate with the D-module 600 of the node 300y to form the active communications session between the nodes 300a to 300y through an exchange of messages requesting and accepting formation of the active communications session. Following its formation, the D-modules 600 of the nodes 300a and 300y may cooperate to maintain the active communications session by recurring exchanges of test signals (e.g., test messages) therethrough to monitor the state of the active communications session.

In addition to the D-modules 600 of the nodes 300a and 300y cooperating to form and maintain the depicted active communications session through the inter-cluster interconnect 399 to support such exchanges of replica data access commands, the D-modules 600 of all of the nodes 300*a-b* and 300*y-z* may cooperate to form and maintain the depicted inactive communications sessions through the inter-cluster interconnect 399 in preparation for handling an error condition affecting one of the nodes 300*a* or 300*y*. More specifically, test signals (e.g., test messages) may be exchanged through one or more of the inactive communications sessions to monitor their state.

In the event of a failure of at least a portion of the node 300*a*, the node 300*b* may take over for the node 300*a*, and in so doing, may change the state of the inactive communications session extending between the D-modules 600 of the nodes 300*b* and 300*y* into an active communications session. By doing so, the node 300*b* becomes able to transmit replica data access commands to the node 300*y* in place of the node 300*a*. Correspondingly, in the event of a failure of at least a portion of the node 300*y*, the node 300*z* may take over for the node 300*y*, and in so doing, may change the state of the inactive communications session extending between the D-modules 600 of the nodes 300*a* and 300*z* into an active communications session. By doing so, the node 300*z* becomes able to receive and perform replica data access commands from the node 300*a* in place of the node 300*y*.

In various embodiments, each of the processor components 450, 550 and 650 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked.

In various embodiments, each of the control routines 440, 540 and 640 may include one or more of an operating system, device drivers and/or application-level routines (e.g., so-called "software suites" provided on disc media, "applets" obtained from a remote server, etc.). As recognizable to those skilled in the art, each of the control routines 440, 540 and 640, including the components of which each may be composed, are selected to be operative on whatever type of processor or processors may be selected to implement applicable ones of the processor components 450, 550 or 650, or to be operative on whatever type of processor or processors may be selected to implement a shared processor component. In particular, where an operating system is included, the operating system may be any of a variety of available operating systems appropriate for corresponding ones of the processor components 450, 550 or 650, or appropriate for a shared processor component. Also, where one or more device drivers are included, those device drivers may provide support for any of a variety of other components, whether hardware or software components, of corresponding ones of the modules 400, 500 or 600.

In various embodiments, each of the memories 460, 560 and 660 may be based on any of a wide variety of information storage technologies, possibly including volatile technologies requiring the uninterrupted provision of electric power, and possibly including technologies entailing the use of machine-readable storage media that may or may not be removable. Thus, each of these memories may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these memories is depicted as a single block, one or more of these may include multiple storage devices that may be based on differing storage technologies. Thus, for example, one or more of each of these depicted memories may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these memories may be made up of multiple storage components based on identical storage technology, but which may be maintained separately as a result of specialization in use (e.g., some DRAM devices employed as a main memory while other DRAM devices employed as a distinct frame buffer of a graphics controller).

In various embodiments, the interfaces 490, 590 and 690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

As has been discussed in detail, redundancy in storing and accessing the client device data 130 may be provided by effecting at least partly parallel performance of data access operations between at least two nodes that belong to different HA groups of different clusters that may be geographically dispersed. As familiar to those skilled in the art, various challenges are presented in coordinating such performances occurring at geographically distant locations, including delays imposed in transmitting commands across a long distance. Further challenges may be imposed by the use of a network in such long distance transmissions, including receiving duplicates of the commands and/or receiving the commands in an order that differs from the order in which they were transmitted and/or from the order in which they are to be executed.

Figure 8:
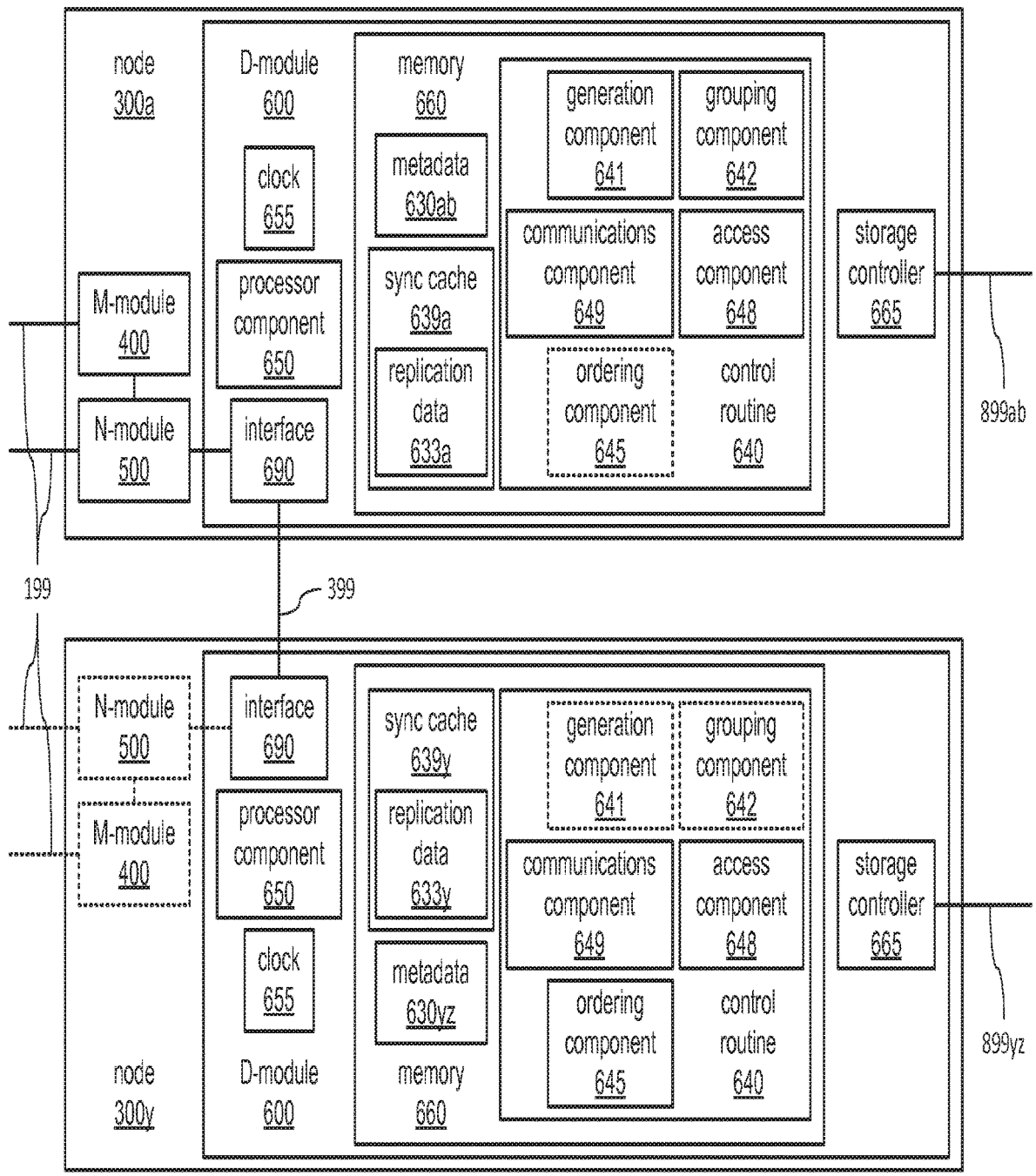
FIG. 8 illustrates an example embodiment of active nodes of different HA groups exchanging replica data access commands.

FIG. 8 illustrates a block diagram of another example embodiment of the interconnections between active nodes 300a and 300y of the storage cluster system 1000 in greater detail. More specifically, FIG. 8 depicts aspects of employing identifiers that may be assigned to individual data access commands and/or to sets of data access commands to enable better coordination of the at least partially parallel performance and/or cancellation of data access commands between the D-modules 600 of the nodes 300a and 300y. As depicted, the node 300a may be active to engage in communications with a client device 100 and to perform data access commands, while the node 300y may be active to engage in communications with the node 300a and to perform replica data access commands at least partly in parallel with the node 300a.

As depicted, the control routine 640 within the D-modules 600 of each of the nodes 300a and 300y may incorporate one or more of a generation component 641, a grouping component 642, an ordering component 645, an access component 648 and a communications component 649. In executing the control routine 640, the processor component 650 of each of these D-modules 600 may execute one or more of the components 641, 642, 645, 648 or 649 of the control routine 640. However, just as there may be differences in the portions of the control routine 640 that are executed by the processor component 650 in an active node versus an inactive node, there may also be differences in portions of the control routine 640 that are executed by the processor component in a node that is active to perform data access commands versus a node that is active to perform replica data access commands. More specifically, the processor component 650 of the D-module 600 of the node 300a may execute one or more of the components 641, 642, 648 and 649 (drawn with solid lines), but may refrain from executing the component 645 (drawn with dotted lines). In contrast, the processor component 650 of the D-module 600 of the node 300y may execute one or more of the components 645, 648 and 649 (drawn with solid lines), but may refrain from executing the components 641 and 642 (drawn with dotted lines).

Within the D-modules 600 of each of the nodes 300a and 300y, the communications component 649 may operate the interface 690 to exchange commands and/or data with components of other nodes (e.g., D-modules 600 of other nodes) and/or with other components of the same node (e.g., a N-module 500 of the same node). More specifically, within the node 300a, the communications component 649 may receive data access commands from the N-module 500, and may transmit replica data access commands organized into sets of the replica data access commands to the D-module 600 of the active node 300y via the inter-cluster interconnect 399. In so transmitting those replica command sets to the node 300y, each replica command set may be broken up into and transmitted in portions that are conveyed in separate network packets. Within the node 300y, the communications component 649 may receive the portions of the replica command sets from the D-module 600 of the node 300a out of the order in which those portions were transmitted and/or with some degree of duplication caused by transmission through a network through which the inter-cluster interconnect 399 may extend, such as the Internet. As previously discussed, in exchanging replica data access commands via the interconnect 399, the replication data 633a and 633y maintained within the sync caches 639a and 639y, respectively, may be employed in buffering such exchanges.

Within the D-modules 600 of each of the nodes 300a and 300y, the access component 648 may operate the storage controller 665 to perform various data access operations on client device data 130 stored within the sets of storage devices 800ab and 800yz, respectively. More specifically, within the node 300a, the access component 648 may perform the data access commands translated from storage service requests and provided by the N-module 500 of the node 300a. Within the node 300y, the access component 648 may perform the replica data access commands generated by the D-module 600 of the node 300a by replicating the data access commands provided by the N-module 500 of the node 300a, and provided to the node 300y via the inter-cluster interconnect 399. As previously discussed, the performances of the data access commands and the replica data access commands derived therefrom may occur at least partly in parallel.

Within the D-module 600 of the node 300a, the generation component 641 may generate versions of the metadata 630ab from portions of metadata received from the M-module 400 and/or the N-module 500 as has been described. As has also been discussed, the generation component 641 may request updated portions of metadata from one or both of the M-module 400 and/or the N-module 500 as needed to update mutable and/or immutable pieces of metadata making up the metadata 630ab in response to unsuccessful attempts to use the metadata 630ab as retrieved from the set of storage devices 800ab following a rebooting of at least the D-module 600 of the node 300a.

Within the D-module 600 of the node 300a, the grouping component 642 may group multiple ones of the data access commands received from the N-module 500 into command sets, and may correspondingly group matching ones of the replica data access commands replicated from the data access commands into matching replica command sets. The grouping component 642 may assign matching sequence IDs to matching ones of the data access commands and replica data access commands, and/or may assign matching set IDs to matching ones of the command sets and replica command sets. The grouping component 642 may form a new command set and matching replica command set in response to the passage of a recurring interval of time, in response to characteristics of the data access commands, and/or in response to a change in the metadata 630ab that may affect performance of the data access commands. Where derivation of new command set may be based on the passage of an interval of time, the grouping component 642 may employ a clock 655 of the D-module 600 to monitor the passage of time.

Within the D-module 600 of the node 300y, the ordering component 645 may employ set IDs and/or sequence IDs to reassemble one or more replica command sets as portions thereof are received by the node 300y from the node 300a via the inter-cluster interconnect 399. In so doing, the ordering component 645 may employ at least the set IDs to determine what network packets are conveying portions of replica command sets that have already been received such that those portions are redundant, and such that the network packets conveying those redundant portions may be discarded as redundant. The ordering component 645 may also employ at least the set IDs to condition commencement of performance of replica data access commands of a later replica command set on whether or not the performance of replica data access commands of an earlier replica command set is complete. The ordering component 645 may further employ at least the set IDs to coordinate cancellation of the performance of data access commands at least partially in parallel with the node 300a, including employing the set IDS to determine what network packets are conveying portions of replica command sets that include replica data access commands that are not to be performed such that those portions are redundant, and such that the network packets conveying those redundant portions may be discarded as redundant.

Figure 9A:
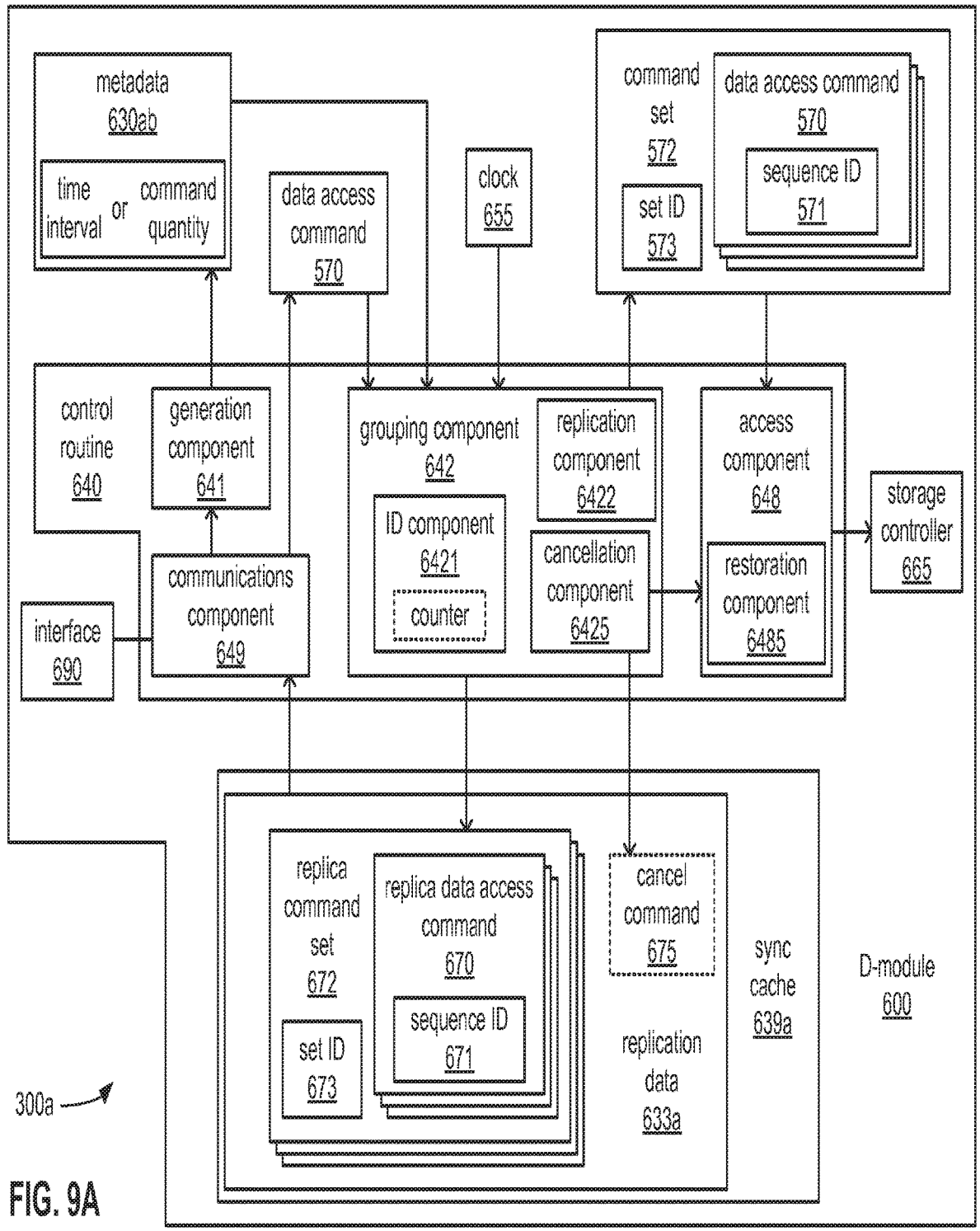
FIGS. 9A and 9B, together, illustrate an example embodiment of formation and transmission of replica command sets between two active nodes.
Figure 9B:
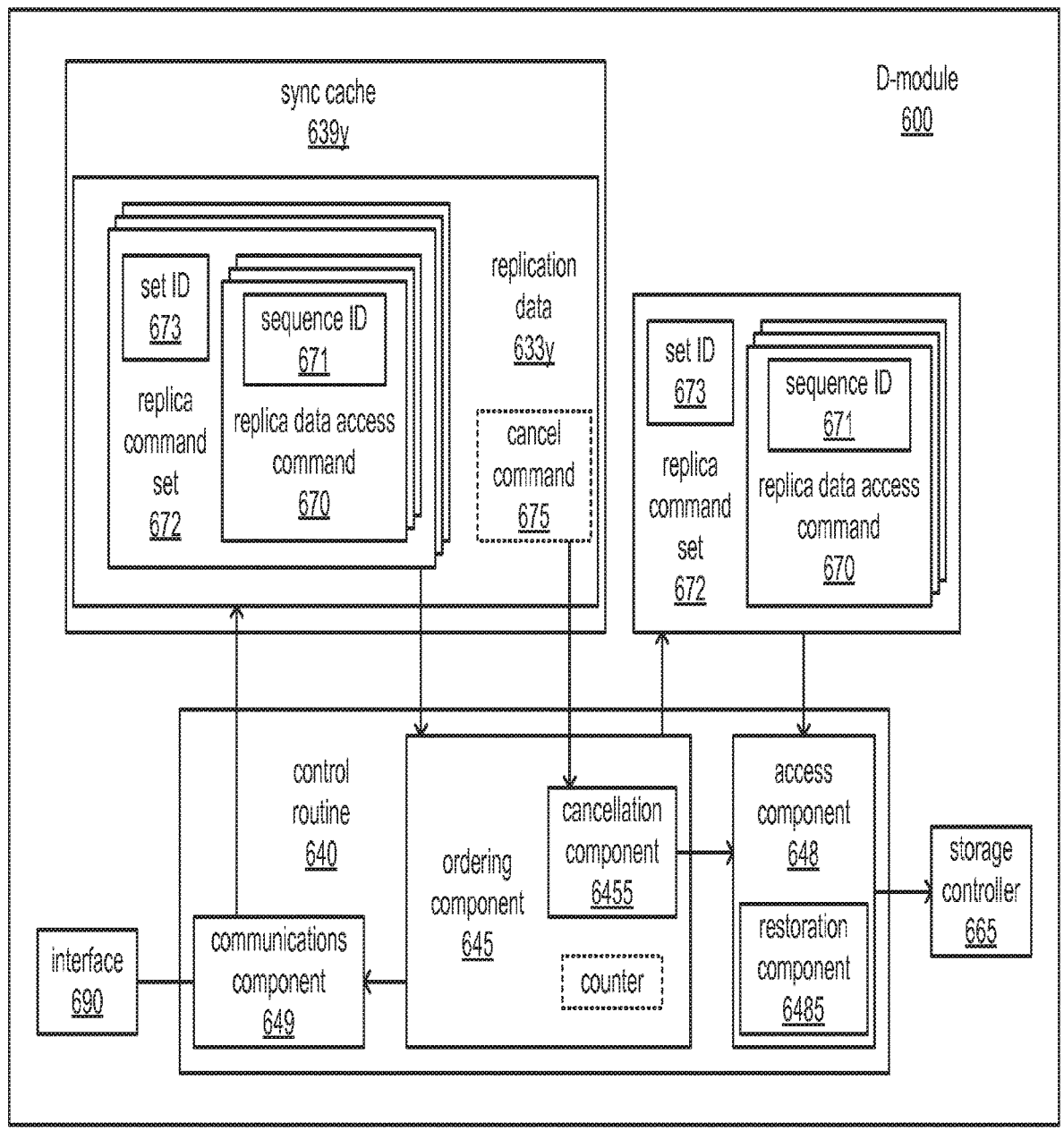

FIGS. 9A and 9B, together, depict aspects of generating and using matching command sets and replica command sets with matching set IDs to coordinate at least partially parallel performance and/or partially parallel cancellation of performance of data access commands and replica data access commands in greater detail. More specifically, FIG. 9A depicts aspects of grouping data access commands 570 into command sets 572 and of grouping matching replica data access commands 670 into matching replica command sets 672. FIG. 9A also depicts aspects of assigning matching set IDs 573 and 673 to matching ones of the command sets 572 and replica command sets 672, respectively. FIG. 9B depicts aspects of employing at least the set IDs 673 of the replica command sets 672 to reassemble portions of the replica commands sets 672 that may be received out of the order in which they were transmitted into the replica command sets 672. Both FIGS. 9A and 9B depict aspects of employing at least the set IDs 573 and 673 to coordinate cancellation of specified data access commands and matching replica data access commands.

Turning to FIG. 9A, the grouping component 642 may incorporate one or more of an ID component 6421, a replication component 6422 and a cancellation component 6425. As previously discussed, the communications component 649 may operate the interface 690 to receive data access commands 570 from the N-module 500 of the node 300a and may relay those data access commands 570 to the grouping component 642. The grouping component 642 may group multiple ones of the data access commands 570 into multiple command sets 572. In so forming the command sets 572, the grouping component 642 may preserve an order in which the data access commands 570 are to be performed among the data access commands 570 that are grouped together within each of the command sets 572, and may form the command sets 572 in an order that is based on the order of performance of the data access commands 570 between command sets 572. Such an order in which the data access commands 570 are to be performed may be derived by the N-module 500 as part of translating storage service requests into the data access commands 570. As previously discussed, there may be instances in which a single storage service request received by the N-module 500 is translated into multiple data access commands 570. Further, such an order of performance of the data access commands 570 may be indicated by the N-module 500 to the D-module 600 as part of providing the data access commands 570 to the D-module 600. For example, the N-module 500 may provide the data access commands 570 to the D-module 600 in such an order.

As part of preserving the order of performance of the data access commands 570, the ID component 6421 may generate and assign a sequence ID 571 to each data access command 570. In some embodiments, the sequence IDs 571 may be ordinal values (e.g., integers) that may be generated by incrementing or decremented a value for each data access command 570 and may be assigned to the data access commands 570 in an ascending or descending order of ordinal value to indicate the order in which the data access commands 570 are to be performed. Thus, generating a new sequence ID 571 for each data access command 570 may entail incrementing or decrementing a counter operated by the ID component 6421. Alternatively or additionally, the sequence IDs 571 may be at least partly based on the current time. More specifically, the ID component 6421 may recurringly retrieve the current time from the clock 655, and may generate and assign a sequence ID 571 to each data access command 570 based on the time at which each was received by the D-module 600 of the node 300a, based on the time at which the sequence ID 571 is assigned, and/or based on the time at which a different event involving each data access command 570 occurs. Where the sequence IDs 571 are so based on time, the sequence IDs 571 may be ordinal values incorporating a time and a date, and may be assigned in an ascending order of ordinal value to indicate the order of performance of the data access commands 570.

It should be noted that although the D-module 600 is depicted and discussed herein as generating the sequence IDs 571, other embodiments are possible in which the sequence IDs 571 are generated by the N-module 500 such that the data access commands 570 are received by the D-module 600 with the sequence IDs 571 already assigned. This may be deemed desirable in light of the data access commands 570 being generated by the N-module 500 as part of translating the storage service requests received from one or more of the client devices 100. In essence, it may be deemed more efficient to assign a sequence ID 571 to each data access command 570 as the data access commands 570 are so generated.

Regardless of the exact manner in which the sequence ID 571 for each data access command 570 is generated, in some embodiments, the set IDs 573 for each of the command sets 572 may be based on the sequence IDs 571 of one or more of the data access commands 570 included within each of the command sets 572. As previously discussed, the data access commands 570 may be grouped to form the command sets 572 in a manner in which the order of performance of the data access commands 570 within each command set 572 is preserved, and/or the command sets 572 may be formed in an order that follows the order of performance of the data access commands 570. For example, in some embodiments, the set ID 573 of each command set 572 may be based on the sequence ID 571 of the data access command 570 within each command set 572 that is to be performed first or that is to be performed last. This may be the case where the sequence IDs 571 are in some manner based on the time recurringly retrieved from the clock 655. In other embodiments, the set IDs 573 may be ordinal values (e.g., integers) that may be generated by incrementing or decrementing a value for each command set 572 in an ascending or descending order of ordinal value to indicate the order in which the data access commands 570 within each command set 572 are to be performed relative to the data access commands 570 within others of the command sets 572. Thus, generating a new set ID 573 for each command set 572 may also entail incrementing or decrementing a counter operated by the ID component 6421.

Since the command sets 572 may be formed in an order following the order of performance of the data access commands 570 and/or by grouping the data access commands 570 in a manner that preserves that order within each of the command sets 572, determinations by the grouping component 642 of what data access commands 570 are at the start and end (in terms of order of performance) within each command set 572 may be based on a maximum interval of time associated with data access commands 570 that are grouped into each of the command sets 572. More specifically, the metadata 630ab may include an indication of a maximum interval of time to be associated with the data access commands 570 grouped into any one of the command sets 572. In some embodiments, this may specify a maximum interval of time over which a multitude of data access commands 570 to be grouped together may be received from the N-module 500 such that no command set 572 may include a grouping of data access commands 570 that took longer than the maximum interval of time to receive from the N-module 500. In other embodiments, this may specify a maximum interval of time required for a multitude of data access commands 570 within any command set 572 to be performed. Alternatively, in other embodiments, the metadata 630ab may specify a maximum quantity of data access commands 570 to be included in any command set 572.

The communications component 649 may operate the interface 690 to receive portions of metadata from the M-module 400 and/or the N-module 500 of the node 300a, and the communications component 649 may relay those portions of metadata to the generation component 641. From at least those portions of metadata, the generation component 641 may generate one or more versions of the metadata 630ab. One or more of those portions of metadata relayed to the generation component 641 may include an indication of the maximum time interval that may be associated with the data access commands 570 that are grouped together into any one command set 572, and/or a maximum quantity of data access commands 570 that may be grouped together into any one command set 572 that may be provided in the metadata 630ab.

Alternatively or additionally, the grouping component 642 may group one or more data access commands 570 within each grouping component 642 based on one or more characteristics of the data access commands 570, themselves. In some embodiments, the grouping component 642 may group together data access commands 570 in which no two data access commands 570 are associated with the same portion of client device data 130 and/or in which no two data access commands 570 access the same portion of a storage device. It may be deemed desirable to form at least a subset of the command sets 572 from data access commands 570 that could be performed out of the order indicated by their sequence IDs without ill effects (e.g., without creating race conditions in which the state of the client device data 130 as stored within one of the sets of storage devices 800ab or 800yz differs depending on the order in which the data access commands 570 in one of those multitudes is performed). For example, a consecutive series of data access commands 570 to read different portions of the client device data 130 may be grouped together within a command set 572 based on the fact that the order in which those data access commands 570 are performed does not affect the state of the client device data 130 as stored within one of the sets of storage devices 800ab or 800yz.

Also alternatively or additionally, the grouping component 642 may group data access commands 570 into two separate command sets 572 based on which ones of the data access commands 570 are to be performed with an earlier version of the metadata 630ab and which ones of the data access commands 570 are to be performed with a later version of the metadata 630ab. As has been discussed, the metadata 630ab may specify various aspects of the storage of the client data 130 within the set of storage devices 800ab and/or retrieval of portions of the client device data 130 therefrom. As a result, a new version of the metadata 630ab may be generated by the generation component 641 that changes one or more of those aspects, and some of the data access commands 570 may be associated with an earlier version of the metadata 630ab such that they are intended to be performed before such changes take effect, while others of the data access commands 570 may be associated with the new version of the metadata 630ab such that they are intended to be performed after such changes take effect. In response, the grouping component 642 may group the ones of the data access commands 570 associated with the earlier version of the metadata 630ab into an earlier one of the command sets 572, while grouping the others of the data access commands 570 associated with the newer version of the metadata 630ab into a later one of the command sets 572. Indeed, the later of these two command sets may immediately follow the earlier of these two command sets such that the transition between them coincides with the changes specified in the newer version of the metadata 630ab taking effect.

The grouping component 642 may provide each command set 572 to the access component 648 to be performed as each command set 572 is formed. Since the command sets 572 may be formed in an order that follows the order of performance of the data access commands 570, such provision of each command set 572 to the access component 648 as they are performed should result in the access component 648 receiving the data access commands 570 in the order in which they are to be performed. Still, in some embodiments, the access component 648 may employ the sequence IDs assigned to each data access command 570 to ensure that the access component 648 operates the storage controller 665 to perform the data access commands 570 in the order in which they were meant to be performed.

As the command sets 572 are formed and/or are provided to the access component 648, the replication component 6422 may generate replicas of the commands sets 572 in the form of the replica command sets 672. Each replica command set 672 may be generated to match one of the commands sets 572, including having a set ID 673 that matches the set ID 573 of the matched one of the command sets 572. Thus, each replica command set 672 may include a multitude of replica data access commands 670 that match a multitude of data access commands 570 grouped into one of the command sets 572, and that multitude of replica data access commands 670 may be assigned sequence IDs 671 that match the sequence IDs 571 assigned to that multitude of data access commands 570. The replication component 6422 may store each of the replica command sets 672 as a portion of the replication data 633a within the sync cache 639a to enable the communications component 649 of the D-module 600 of the node 300a to operate the interface 690 of the node 300a to transmit each replica command set 672 via the inter-cluster interconnect to the D-module 600 of the node 300y.

Turning to FIG. 9B, the communications component 649 of the D-module 600 of the node 300y may operate the interface 690 of the node 300y to receive the replica command sets 672 from the D-module 600 of the node 300a and may temporarily store the replica commands sets 672 as part of the replication data 633y within the sync cache 639y. The ordering component 645 may retrieve the replica command sets 672 from the replication data 633y and provide the retrieved replica command sets 672 to the access component 648 in an order that follows the order in which the replica data access commands 670 within the replica command sets 672 are to be performed. The access component 648 may then operate the storage controller 665 of the D-module 600 of the node 300y to perform the replica data access commands 670 of each the replica command sets 672 so provided by the ordering component 645.

As previously discussed, the inter-cluster interconnect 399 may be routed through a network (e.g., the network 999) in some embodiments. Depending on various characteristics of that network, such as whether that network employs a packet-based protocol, each of the replica command sets 672 may be broken up into multiple portions that may each be conveyed in a separate network packet through that network. Thus, the communications component 649 of the D-module 600 of the node 300y may reassemble the multiple portions of each of the replica command set 672 within the replication data 633y as the network packets conveying those portions are received from the inter-cluster interconnect 399.

As familiar to those skilled in the art, some networks may be architected in a manner in which different packets take different pathways through differing connections making up a network such that the packets may be received at a receiving device in an order that differs from the order in which they were transmitted by a transmitting device. This possibility of packets being received in a different order than transmitted may result in the packets making up a single one of the replica command sets 672 arriving at the interface 690 of the node 300y out of the order in which they were transmitted by the interface 690 of the node 300a. Thus, performance of at least some of the replica data access commands 670 of that single replica command set 672 that have already been received may need to be delayed until the packets conveying others of the replica data access commands 670 of that same replica command set 672 that are meant to be performed earlier are also received and those others of the replica data access commands 670 have been performed. Again, this may be in spite of the packets being transmitted in an order corresponding to the order in which the replica data access commands 670 were to be performed.

Alternatively or additionally, this possibility of packets being received in a different order than transmitted may result in packets that make up multiple ones of the replica command sets 672 arriving at the interface 690 of the node 300y out of order such that all of the replica data access commands 670 of a later transmitted replica command set 672 are received before all of the replica data access commands 670 of an earlier transmitted replica command set 672. Presuming that the replica data access commands 670 of the earlier transmitted replica command set 672 must be fully performed before the replica data access commands 670 of the later transmitted replica command set 672, performance of the replica data access commands 670 of the later transmitted (but earlier received) replica command set 672 may need to be delayed until all of the replica data access commands 670 of the earlier transmitted replica command set 672 are both received and performed.

The ordering component 645 may cooperate with the communications component 649 to reassemble portions of multiple replica command sets 672 in the sync cache 639y from packets received from the inter-cluster interconnect 399 in an order that follows the intended order of performance of the replica data access commands 670, and regardless of the order in which those packets are received. The communications component 649 of the D-module 600 of the node 300a may include an indication of the set ID 673 of the replica command set 672 to which each portion of a replica command set 672 conveyed within a network packet belongs in the network packet that transmits that portion. The communications component 649 of the D-module 600 of the node 300y may then employ the set ID 673 so included in each received network packet to match the conveyed portion of a replica command set 672 within that network packet to one of the replica command sets 672 that may be amidst being reassembled. Such use of the set IDs 673 in each such network packet may provide a mechanism to more quickly reassemble the replica command sets 672 than analyzing the sequence IDs 671 of the replica data access commands 670 contained within each portion conveyed within such a network packet and then matching those sequence IDs 671 to a particular replica command set 672.

As also familiar to those skilled in the art, some networks may also be architected in a manner that results in the creation of redundant network packets as network packets are conveyed from connection to connection making up such a network. Such creation of redundant network packets may be deemed a desirable feature in the architecture of a network to provide some degree of redundancy in ensuring that each transmitted packet is received at its intended destination, and/or may be deemed as a desirable feature to speed the delivery of network packets by causing redundant ones of the network packets to be conveyed along different pathways within a network in parallel as a mechanism to find the fastest pathway to the destination. However, this may result in the receipt of the same portion(s) of a replica command set 672 multiple times at the interface 690 of the node 300y.

The ordering component 645 may cooperate with the communications component 649 of the D-module 600 of the node 300y to use the set IDs 673 included in each network packet as a mechanism to identify at least some redundant packets more quickly than by analyzing the sequence IDs 671 of the replica data access commands 670, thereby allowing those redundant network packets to be discarded more quickly. The ordering component 645 may track the set IDs 673 of replica command sets 672 that have already been fully reassembled such that any more network packets that are received that include a set ID 673 of such a fully reassembled replica command set 672 must be redundant, since there are no more portions of that fully reassembled replica command set 672 that are still awaited for that replica command set 672 to be fully reassembled. Alternatively or additionally, the ordering component 645 may track set IDs 673 of replica command sets 672 in which the replica data access commands 670 have already been fully performed by the access component 648 such that any more network packets that are received that include a set ID 673 of such a fully performed replica command set 672 must be redundant. The ordering component 645 may recurringly convey indications of set IDs 673 of such fully reassembled and/or fully performed replica command sets 672 to the communications component 649 to enable the communications component 649 to more quickly identify and discard such redundant network packets.

In embodiments in which the set IDs 573 and 673 are ordinal values that are generated by the ID component 6421 (and/or by a component of the N-module 500 of the node 300a) by incrementing or decrementing a counter, the ordering component 645 may increment or decrement, respectively, a corresponding counter operated by the ordering component 645 to indicate the set ID 673 of the replica command set 672 most recently fully performed by the access component 648 of the D-module 600 of the node 300y. The ordering component 645 may recurringly provide the current value of that counter to the communications component 649 of the D-module 600 of the node 300y to use in comparing with the set ID 673 included in each received network packet conveying a portion of a replica command set 672 to identify redundant network packets to discard. By way of example, in embodiments in which the set IDs 673 are ordinal values that are generated by incrementing a counter such that organizing the replica command sets 672 in correct order for performance of the replica data access commands 670 entails ordering the replica command sets 672 to have their set IDs 673 in ascending order of ordinal value, the communications component 649 of the D-module 600 of the node 300y may discard each received packet that includes a set ID 673 having a value equal to or less than the current counter value provided by the ordering component 645. Again, this may provide a faster mechanism of determining which networks packets to discard as redundant than analyzing the sequence IDs 671 of the replica data access commands 670 conveyed within the portions of replica command sets 672 conveyed within each packet to determine if those particular replica data access commands 670 have been already been previously received and/or performed.

As previously discussed, the grouping of data access commands 570 into command sets 572 may be at least partly based on identifying sets of consecutive data access commands 570 to group together that may be performed out of order without ill effects (e.g., without generating race conditions). Accordingly, replica command sets 672 derived from such command sets 572 may include sets of replica data access commands 670 that may be performed out of order by the access component 648 of the D-module 600 of the node 300y without such ill effects. Thus, even as the ordering component 645 reassembles each replica command set 672 in a manner that maintains the intended order of performance of the replica data access commands 670 therein, and even as the ordering component 645 provides the replica command sets 672 to the access component 648 in an order that follows the intended order of performance, the access component 648 may perform the replica data access commands 670 within individual ones of the command sets 672 out of order. This may be deemed desirable to enable the access component 648 to better optimize the speed at which the replica data access commands 670 are performed on the set of storage devices 800yz.

Figure 10A:
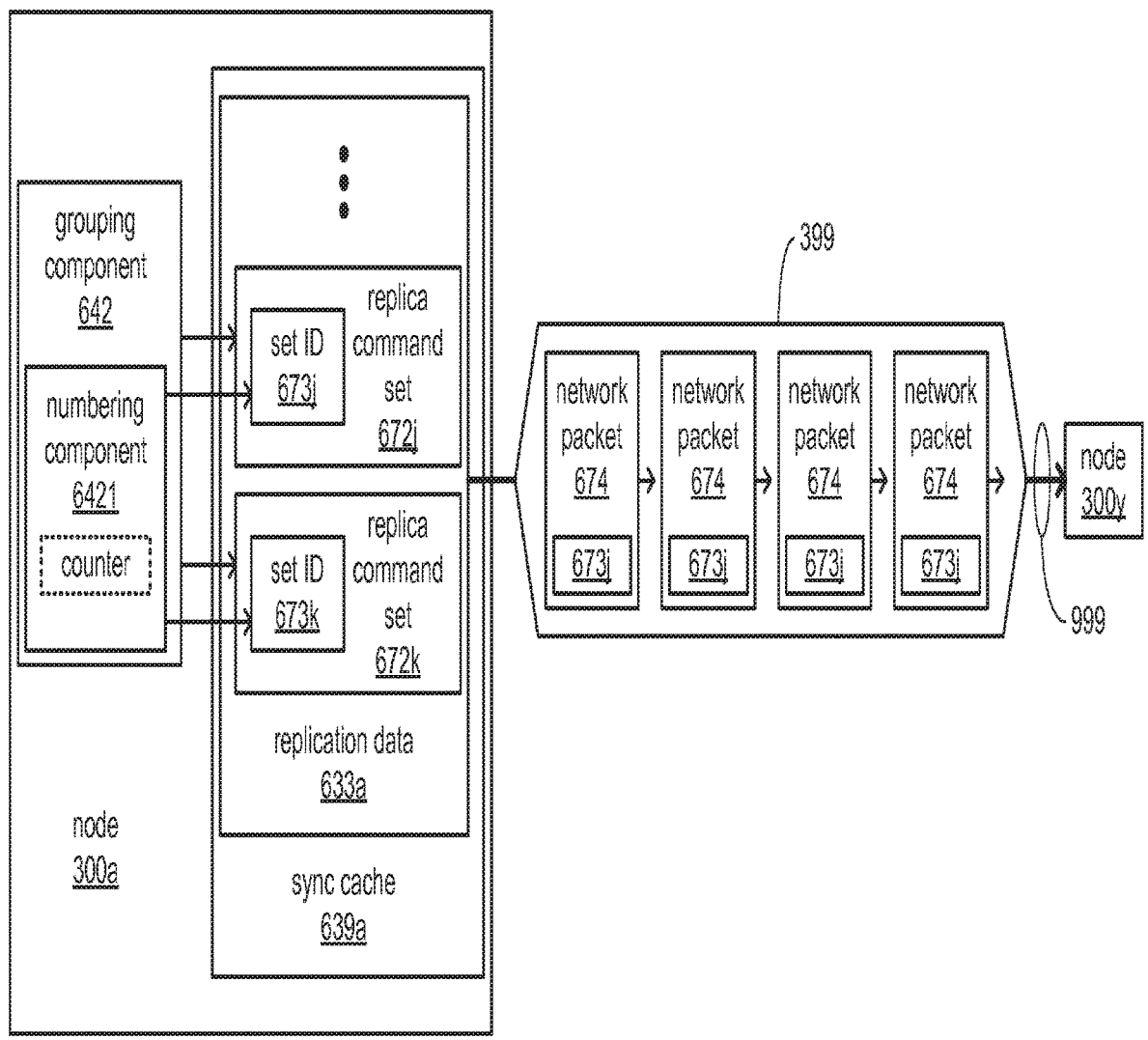
FIGS. 10A and 10B, together, illustrate an example embodiment of transmission of replica command sets in portions within network packets between two active nodes.
Figure 10B:
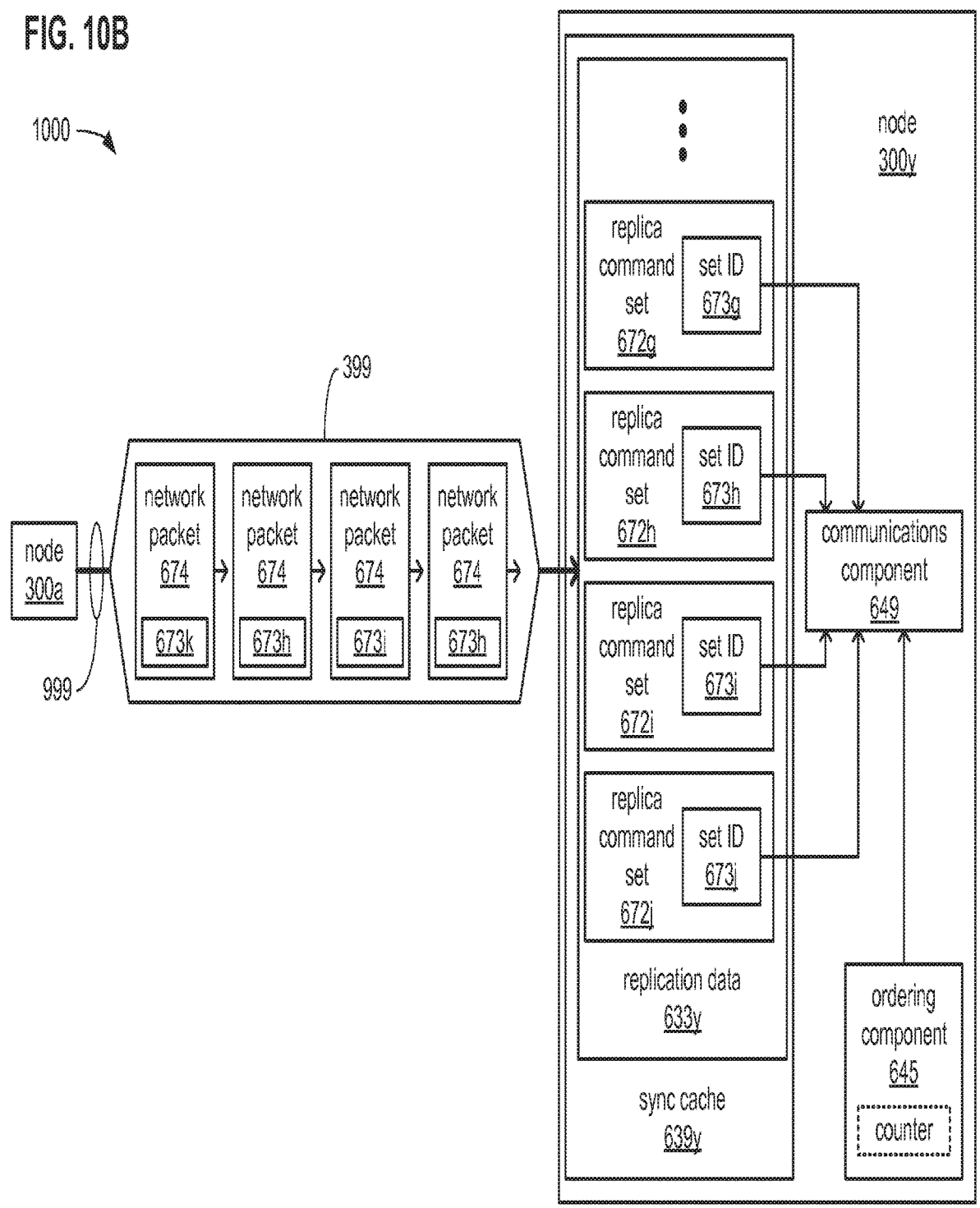

FIGS. 10A and 10B, together, depict aspects of an embodiment of transmitting and receiving network packets 674 that include set IDs 673 to convey replica command sets 672 via the inter-cluster interconnect 399 extending between at least the nodes 300a and 300y through the network 999. More specifically, FIG. 10A depicts the transmission of examples of replica command sets 672, including examples of set IDs 673, from the node 300a to the node 300y via the inter-cluster interconnect 399. FIG. 10B depicts the reception of examples of replica command sets 672, including examples of set IDs 673, by the node 300y from the node 300a via the inter-cluster interconnect 399.

Turning to FIG. 10A, example replica command sets 672j and 672k (each of which is an instance of a replica command set 672) are formed within the sync cache 639a as part of the replication data 633a. In some embodiments, the manner in which replica command sets 672 are generated within and transmitted from the sync cache 639a may resemble a double buffer. More specifically, a pair of locations within the sync cache 639a that are occupied by the replication data 633a may be allocated such that a new replica command set 672 is formed in one of the two portions while the last replica command set 672 to be completely formed is transmitted to the node 300y out of the other of the two portions. Thus, as depicted, portions of the fully formed replica command set 672j may be transmitted to the node 300y in network packets 674 via the interconnect 399, while the grouping component 642 forms the next replica command set 672k. Upon completion of formation of the replica command set 672k, portions of the command set 672k will be also be transmitted in portions within network packet 674 while another replica command set will be formed in the portion of the replica data 633a occupied by the replica command set 672j.

As has been previously discussed, and as is exemplified in FIG. 10A, the network packets 674 conveying portions of each replica command set 672 may be transmitted by node 300a in an order that maintains the intended order of performance of the replica data access commands 670 within each replica command set 672. Thus, the replica command set 672j may be divided into portions and those portions may be transmitted by the node 300a to the node 300y within network packets 674 that are transmitted in an order that preserves the order of performance among the replica data access commands 670 within the portions in those network packets 674, and without network packets 674 conveying portions of any other replica command set 672 interspersed among the network packets 674 conveying portions of the replica command set 672j. As also depicted, the set ID 673j assigned to the replica command set 672j is included in each of the network packets 674 that conveys a portion of the replica command set 672j.

However, as has also been discussed and turning to FIG. 10B, various characteristics of the network 999 through which the inter-cluster interconnect 399 may extend may result in reception of the network packets 674 at the node 300y in a manner that is out of order from their transmission by the node 300a and/or that includes redundant ones of the network packets 674. More specifically and as exemplified in FIG. 10B, though the node 300a may have earlier transmitted all network packets 674 conveying portions of the replica command set 672g, 672h and 672i, and may now be transmitting network packets 674 conveying portions of the replica command set 672j, the node 300y may still be receiving network packets 674 conveying portions of one or more of the replica command sets 672g, 672h and 672i. Thus, unlike the replica data 633a, more than two locations within the sync cache 639y that are occupied by the replication data 633y may be allocated to provide sufficient buffering for more than two replica command sets 672, such as the example replica command sets 672g, 672h, 672i and 672j that are depicted.

Again, as replica command sets 672 are able to be fully reassembled within the sync cache 639y, fully reassembled ones of the replica command sets 672 may be provided to the access component 648 of the D-module 600 of the node 600y by the ordering component 645 in an order that follows the intended order of performance of the replica data access commands 670. As a result, a later transmitted, but earlier received, one of the command sets 672 may not be provided to the access component 648 until all of the portions of an earlier transmitted one of the command sets 672 have been received, and until that earlier transmitted one of the command sets 672 has been fully reassembled and provided to the access component 648. By way of example, the replica command set 672g may include replica data access commands 670 that are to be performed before the replica data access commands 670 of the replica command set 672h, however, the replica command set 672h may be fully received and reassembled within sync cache 639y before the replica command set 672g. In such a situation, the performance of all of the replica data access commands 670 of the replica command set 672h must be delayed until the replica command set 672g is fully received and reassembled, and until all of the replica data access commands of the replica command set 672g have been performed.

As has also been discussed, the ordering component 645 may provide the communications component 649 of the D-module 600 of the node 300y with indications of what replica command sets 672 have been fully performed to enable the communications component 649 to more quickly identify at least some incoming network packets 674 that are redundant such that they can be discarded. By way of example, if the replica data access commands 670 of the replica command sets 672g and 672h have been already been fully performed, then the ordering component 645 may provide the communications component 649 with an indication to that effect. In response to receiving that indication, the communications component 649 may identify ones of the network packets 674 that include the set IDs 673g and 673h, which identify those network packets 674 as conveying a portion of the replica command sets 672g and 672h. Since the replica data access commands of the replica command sets 672g and 672h have already been fully performed, any portion of the replica command sets 672g and 672h received following such full performance is a redundant portion, and therefore, any network packet 674 conveying such a redundant portion is a redundant packet that may be discarded without further analysis of their contents. In some embodiments, the discarding of a redundant network packet 674 may entail not storing any portion of that network packet 674 within the sync cache 639y as part of the replication data 633y.

Returning to FIG. 9A, one of the data access commands 570 received by the communications component 649 from the N-module 500 of the node 300a may be a cancel command to cancel the performance of a series of earlier data access commands 570 indicated in the cancel command. The communications component 649 may relay such a cancel command to the grouping component 642 along with the other data access commands 570 received from the N-module 500. The cancellation component 6425 of the grouping component 642 may analyze the indication within the cancel command of what earlier received data access commands 570 are included in the series of data access commands 570 that are to have their performances canceled to identify what sequence IDs 571 and/or what set IDs 573 are associated with the data access commands 570 that are within that series. At least where the series of data access commands 570 that are to have their performances canceled include one or more entire command sets 572, the cancellation component 6425 may signal the access component 648 with an indication of the set ID(s) 573 of the one or more command sets 572 for which the performances of all the data access commands 570 are to be canceled.

In response to receiving such an indication from the cancellation component 6425 of the grouping component 642, the access component 648 may cease any performance already underway of a data access command 570 of any of the command sets 572 specified in the indication, may prevent the performance of any of the data access commands 570 of any of the command sets 572 specified in the indication that have not yet been performed, and may discard the entirety of the ones of the commands sets 572 specified in the indication. Thus, if none of the data access commands 570 of a command set 572 specified in such an indication from the cancellation component 6425 has yet been performed, then the access component 648 may simply discard that entire command set 572. In some embodiments, such discarding of a command set 572 may entail allowing that command set 572 to be overwritten wherever it is stored to be retrieved for performance by the access component 648.

However, as recognizable to those skilled in the art, there remains the possibility that such an indication to cancel performances of data access commands 570 of one or more specific command sets 572 may be received by the access component 648 after at least a subset of those data access commands 570 have already been performed. Thus, the state of the client device data 130 as stored within the set of storage devices 800ab may have already been changed as a result of the performance of that subset of the data access commands 570.

In some embodiments, the maximum time interval or maximum command quantity indicated in the metadata 630ab may represent an indication of a maximum degree of data loss that may be deemed acceptable as a result of data corruption arising from any of a variety of circumstances. Those circumstances may include corruption arising from receipt of a command to cancel the performance of data access commands 570 of one or more of the command sets 572 at a time that is too late to prevent the performance of at least a subset of those data access commands 570. Thus, transmission of such a cancel command by one of the client devices 100 to the node 300a may be effected with the understanding that such a cancellation may not be entirely successful at restoring the client device data 130 to the state it was in as stored within the storage devices 800ab and/or 800yz before the performance of such a subset of data access commands.

In other embodiments, the access component 648 may include a restoration component 6485 to undo the performance of at least a subset of data access commands 570 within the one or more commands sets 572 included in the indication received by the access component 648 from the cancellation component 6425. Stated differently, the restoration component 6485 may restore the state of the client device data 130 as stored within the set of storage devices 800ab to what the state of the client device data 130 was before the data access commands 570 of the one or more command sets 572 included in that indication were performed. In some of such embodiments, the restoration component 6485 may maintain a buffer in which the data access commands 570 of one or more command sets 572 are queued in a manner that may resemble a cache to delay their performance so as to allow an opportunity to prevent the performance of the data access commands of one or more command sets 572 through a cancel command received from the N-module 500. In others of such embodiments, the restoration component 6485 may maintain a buffer in which indications of any changes made to the client device data 130 as stored within the set of storage devices 800ab by the performance of the data access commands of one or more of the command sets 572 may be temporarily stored to enable those changes to be reversed in response to a cancel command received from the N-module 500.

Regardless of whether the access component 648 (or another component of the D-module 600 of the node 300a) provides an ability to reverse the performance of data access commands 570 that have already been performed, the cancellation component 6425 may additionally cooperate with the communications component 649 of the D-module 600 of the node 300a to transmit a cancel command 675 to the node 300y. More specifically, the cancellation component 6425 may store a cancel command 675 within the sync cache 639a as part of the replication data 633a to be transmitted to the node 300y. The cancel command 675 may include an indication of one or more of the replica command sets 672 that include replica data access commands 670 for which their performances are to be canceled. In some embodiments, the cancel command 675 may specify such replica command sets 672 by the set IDs 673 assigned to them. In essence, the cancel command 675 is meant to convey to the access component 648 of the D-module 600 of the node 300y an indication of cancellation that is analogous to the indication provided by the cancellation component 6425 to the access component 648 of the D-module 600 of the node 300a. In this way, both of these access components 648 may be provided with cancellation indications to cancel performances of corresponding ones of the data access commands 570 and the replica data access commands 670 belonging to corresponding ones of the command sets 572 and 672, respectively. Thus, in this way, the access component 648 of the D-modules 600 of the nodes 300a and 300y may effect cancellations of matching ones of the data access commands at least partially in parallel.

In some embodiments, the communications component 649 of the D-module 600 of the node 300a may transmit the cancel command 675 in a network packet that does not include a portion of any of the replica command sets 672. Further, such a separate network packet may be transmitted to the node 300y in a manner in which it may be conveyed to the node 300y faster than the network packets that include a portion of a replica command set 572 in embodiments in which the network through which the inter-cluster interconnect 399 may extend employs a protocol that supports such differences in speed in conveying network packets.

Returning to FIG. 9B, upon receipt of the network packet conveying the cancel command 675, the communications component 649 of the D-module 600 of the node 300y may store the cancel command 675 within the sync cache 639y as part of the replication data 633y. The ordering component 645 may include a cancellation component 6455 to retrieve the cancel command 675 from the sync cache 639y, and relay to the access component 648 of the D-module 600 of the node 300y an indication of the one or more of the replica command sets 672 specified in the cancel command 675 (e.g., by set ID 673) as including replica data access commands 670 for which performances are to be canceled. In response to receiving such an indication from the cancellation component 6455, the access component 648 may cease any performance already underway of a replica data access command 670 of any of the replica command sets 672 specified in the indication, may prevent the performance of any of the data access commands 570 of any of the command sets 572 specified in the indication that have not yet been performed, and may discard the entirety of the ones of the commands sets 572 specified in the indication. Thus, if none of the replica data access commands 670 of a command set 672 specified in such an indication from the cancellation component 6455 have yet been performed, then the access component 648 may simply discard that entire replica command set 672.

However, there again remains the possibility that such an indication to cancel performances of replica data access commands 670 of one or more specific replica command sets 672 may be received by the access component 648 after at least a subset of those replica data access commands 670 have already been performed. Thus, the state of the client device data 130 as stored within the set of storage devices 800yz may have already been changed as a result of the performance of such ones of the replica data access commands 670. Not unlike the access component 648 of the D-module 600 of the node 300a, the access component 648 of the D-module 600 of the node 300y may include a restoration component 6485 to undo the performance of at least a subset of replica data access commands 670 within the one or more replica commands sets 672 included in the indication received by the access component 648 from the cancellation component 6455.

In addition to providing an indication to the access component 648 of replica command sets 672 that include replica data access commands 670 that are not to be performed, the cancellation component 6455 of the ordering component 645 may provide a similar indication to the communications component 649. Such an indication provided to the communications component 649 of the D-module 600 of the node 300y may enable the communications component 649 to discard any network packets that may yet be received that include a portion of one of the replica command sets 672 specified in that indication as redundant network packets. Thus, effecting the cancellation of performances of replica data access commands 670 may include treating portions of those replica command sets 672 that are received after receipt of the cancel command 675 as redundant network packets, since the portions of replica command sets 672 they convey have been made redundant due to the cancel command 675 specifying that the replica data access commands 670 within the replica command sets 672 to which those portions belong will never be performed. Again, the communications component 649 of the node 300y may then effect such discarding by not storing such redundant network packets as part of the replication data 633y within the sync cache 639y.

As previously discussed, in some embodiments, the set IDs 573 and 673 may be ordinal values that are generated by the ID component 6421 (and/or by a component of the N-module 500 of the node 300a) by incrementing or decrementing a value maintained by a counter such that the ordering component 645 may increment or decrement, respectively, a corresponding value maintained by a corresponding counter to indicate the set ID 673 of the replica command set 672 most recently fully performed by the access component 648 of the D-module 600 of the node 300y. In such embodiments, the indication of what command sets 572 and what replica command sets 672 include data access commands 570 and replica data access commands 670, respectively, for which performances are to be canceled may be conveyed as an updated counter value provided to the access components 648 of the D-modules 600 of both of the nodes 300a and 300y. These access components 648 may then compare this updated counter value to the set IDs 573 and 673 of command sets 572 and replica command sets 672, respectively, that are currently being performed and/or are subsequently received by either of these access components 648 to identify redundant ones of the command sets 572 and replica command sets 672 to discard.

By way of example, in embodiments in which the set IDs 573 and 673 are ordinal values that are generated by the ID component 6421 by incrementing a counter, the resulting updated counter value provided to both access components 648 may indicate set IDs 573 and 673 for command sets 572 and replica command sets 672, respectively, that are of higher ordinal value than any of the set IDs 573 or 673 associated with the command sets 572 or replica command sets 672 that include data access commands 570 or replica data access commands 670 that are not to be performed. The access component 648 of the D-module 600 of the node 300a may discard any command set 572 that is currently being performed or that is subsequently provided to that access component 648 that is assigned a set ID 573 that is less than the updated counter value. Correspondingly, the access component 648 of the D-module 600 of the node 300y may discard any command set 672 that is currently being performed or that is subsequently provide to that access component 648 that is assigned a set ID 673 that is less than the updated counter value. Similarly, the communications component 649 of the D-module 600 of the node 300y may also be provided with the updated counter value and may compare that updated counter value to the set IDs 673 of any network packet conveying a portion of a replica command set 672 that the communications component 649 subsequently receives from the node 300a via the inter-cluster interconnect 399. The communications component 649 may discard such network packets that include a set ID 673 with a value that is less than the updated counter value.

Figure 11:
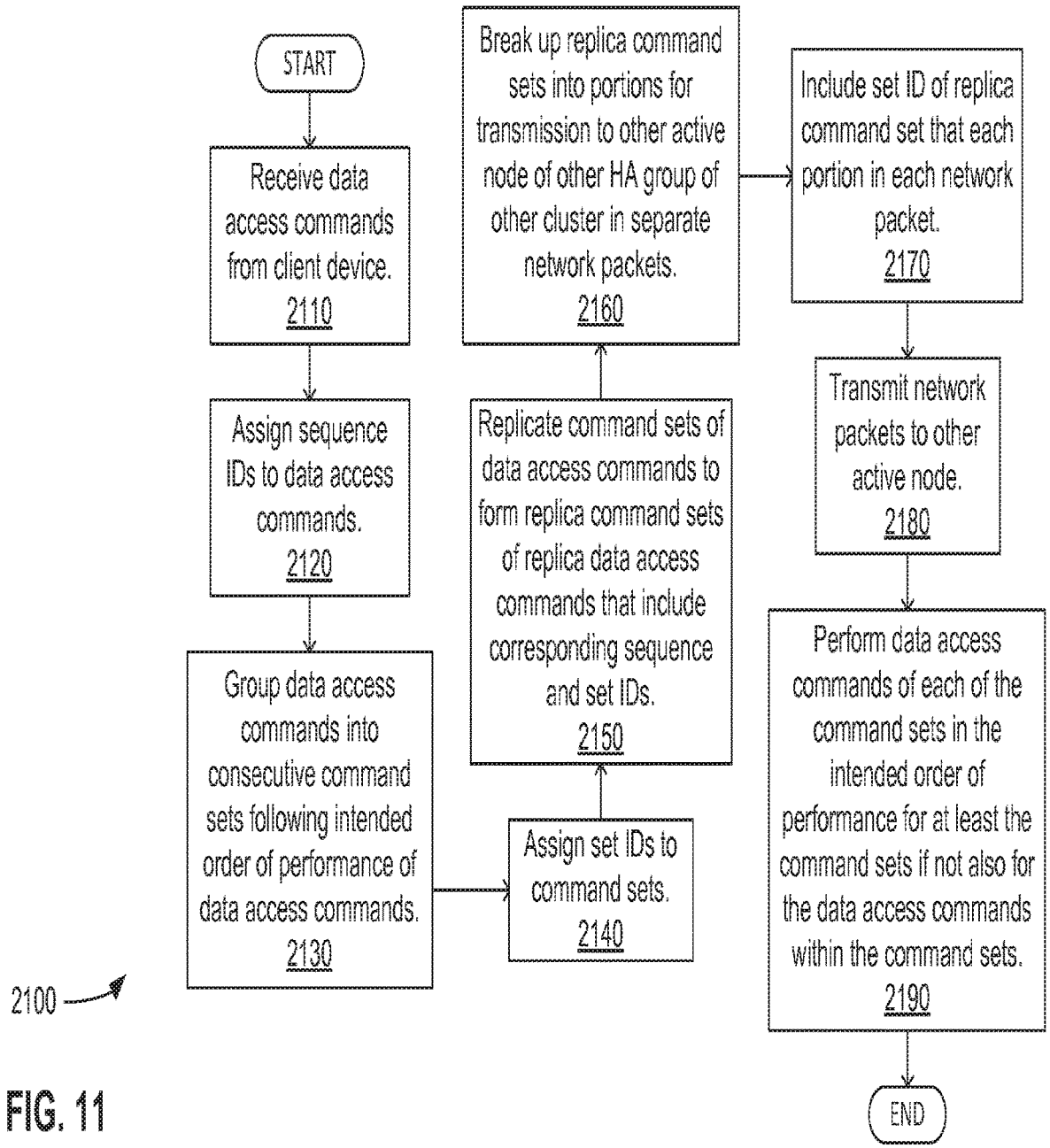
FIG. 11 illustrates a logic flow according to an embodiment.

FIG. 11 illustrates one embodiment of a logic flow 2100. The logic flow 2100 may be representative of some or all of the operations executed by one or more embodiments described herein. More specifically, the logic flow 2100 may illustrate operations performed by the processor component 650 in executing at least the control routine 640, and/or performed by other component(s) of a data storage module (D-module) 600.

At 2110, a processor component of a D-module of an active node of a first HA group of one cluster of a storage cluster system may receive data access commands from a client device to which that active node is coupled via a client interconnect. An example of such an active node may be one of one of the nodes 300a-d of one of the HA groups 1600ab or 1600cd of the cluster 1300a of the storage cluster system 1000, where such a node may be coupled to one or more of the client devices 100 via the client interconnect 199.

At 2120, the processor component may assign sequence IDs to each of the data access commands. As has been discussed, the sequence IDs may be ordinal values assigned to the data access commands in an order of increasing or decreasing ordinal values that indicates an order in which the data access commands are meant to be performed.

At 2130, the processor component may group of multiple ones the data access commands that are meant to be performed consecutively into command sets, and may do so in an order across the command sets that follows the order in which the data access commands are to be performed. As previously discussed, how many of the data access commands are grouped together to form each of the command sets may be determined by various factors, including and not limited to, an amount of time required to receive and/or perform the data access commands that may be grouped into a single command set, a maximum quantity of data access commands that may be included within a single command set, characteristics of the data access commands that may enable the formation of at least one command set within which the data access commands may be performed out of order.

At 2140, the processor component may assign set IDs to the command sets that may also provide an indication of an order of the command sets that follows the order of performance of the data access commands. Not unlike the sequential IDs, the set IDs may also be ordinal values that are assigned to the command sets in an order of increasing or decreasing ordinal value that follows the order in which the data access commands within the command sets are to be performed. At 2150, the processor component may replicate the command sets to generate matching replica command sets assigned set IDs that match those of the matching command sets, and where each replica command set includes one or more replica data access commands that match the data access commands of the matching command set and that are assigned matching sequence IDs.

At 2160, the processor component may break up each replica command set into portions that are each to be transmitted in a separate network packet to another active node that belongs to a second HA group of another cluster of the storage cluster system. An example of such another active node may be another one of the nodes 300a-d of one of the HA groups 1600ab or 1600cd of the cluster 1300a of the storage cluster system 1000.

At 2170, the network packets may be formed to include the set ID of the replica command set to which the included portion of a replica command set belongs. At 2180, the network packets may be transmitted to the other active node via an inter-cluster interconnect extending at least between the two active nodes. As previously discussed, such an inter-cluster interconnect may extend through the same network through which the client interconnect extends.

At 2190, the processor component may perform the data access commands of each of the command sets. In so doing, the processor component may perform the data access commands in an order that follows their intended order of performance to the extent that all data access commands of each command set are fully performed before commencing performance of the data access commands of the next command set. However, within one or more of the command sets, the processor component may not follow the order of performance of the data access commands in some embodiments.

Figure 12:
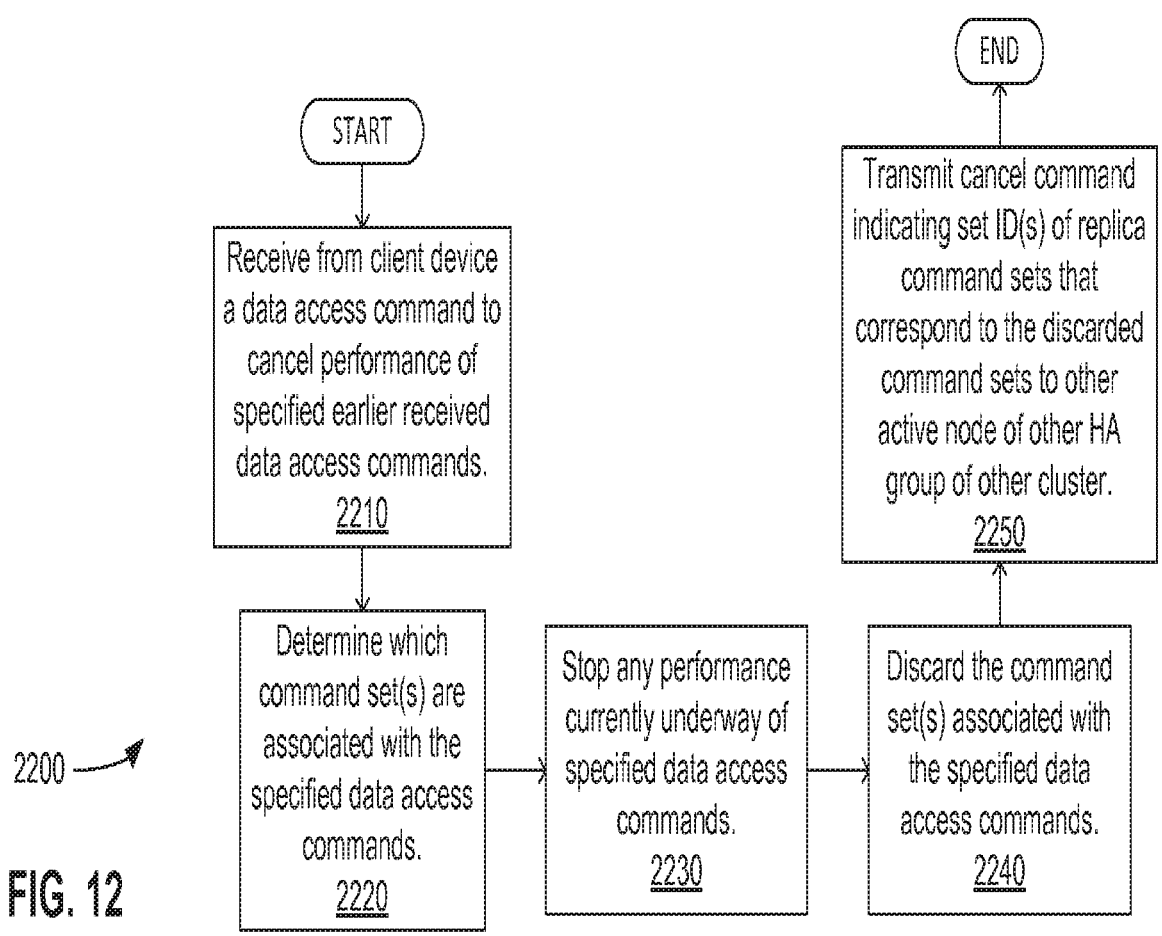
FIG. 12 illustrates a logic flow according to an embodiment.

FIG. 12 illustrates one embodiment of a logic flow 2200. The logic flow 2200 may be representative of some or all of the operations executed by one or more embodiments described herein. More specifically, the logic flow 2200 may illustrate operations performed by the processor component 650 in executing at least the control routine 640, and/or performed by other component(s) of a data storage module (D-module) 600.

At 2210, a processor component of a D-module of an active node of a first HA group of one cluster of a storage cluster system may receive a data access command to cancel the performance of a specified series of earlier received data access commands from a client device to which that active node is coupled via a client interconnect. An example of such an active node may be one of one of the nodes 300a-d of one of the HA groups 1600ab or 1600cd of the cluster 1300a of the storage cluster system 1000, where such a node may be coupled to one or more of the client devices 100 via the client interconnect 199.

At 2220, the processor component may determine the set IDs of at least the command set(s) in which all of the data access commands are among the data access commands specified in the cancel command received from the client device, thereby identifying those command set(s) and their matching replica command set(s). As has been explained, there may be a matching replica command set for each command set, and each of those replica command sets may be assigned a matching set ID.

At 2230, the processor component ceases any currently underway performance of a data access command specified in the cancel command from the client device, and the processor component may discard the command set(s) just identified as associated with the data access commands specified in the cancel command from the client device at 2240. As previously explained, the discarding of a command set may entail refraining from performing its data access commands (at least the ones that haven't already been performed) and/or allowing the location at which the command set is stored to be overwritten with another command set that includes data access commands that are to be performed.

At 2250, the processor component may transmit a cancel command to another active node that belongs to a second HA group of another cluster of the storage cluster system via an inter-cluster interconnect. This cancel command may include indications of the set ID(s) of the replica command sets in which all of the replica data access commands match data access commands that are among the data access commands specified in the cancel command received from the client device. An example of such another active node may be another one of the nodes 300a-d of one of the HA groups 1600ab or 1600cd of the cluster 1300a of the storage cluster system 1000, where the two active nodes may be coupled via the inter-cluster interconnect 399.

Figure 13:
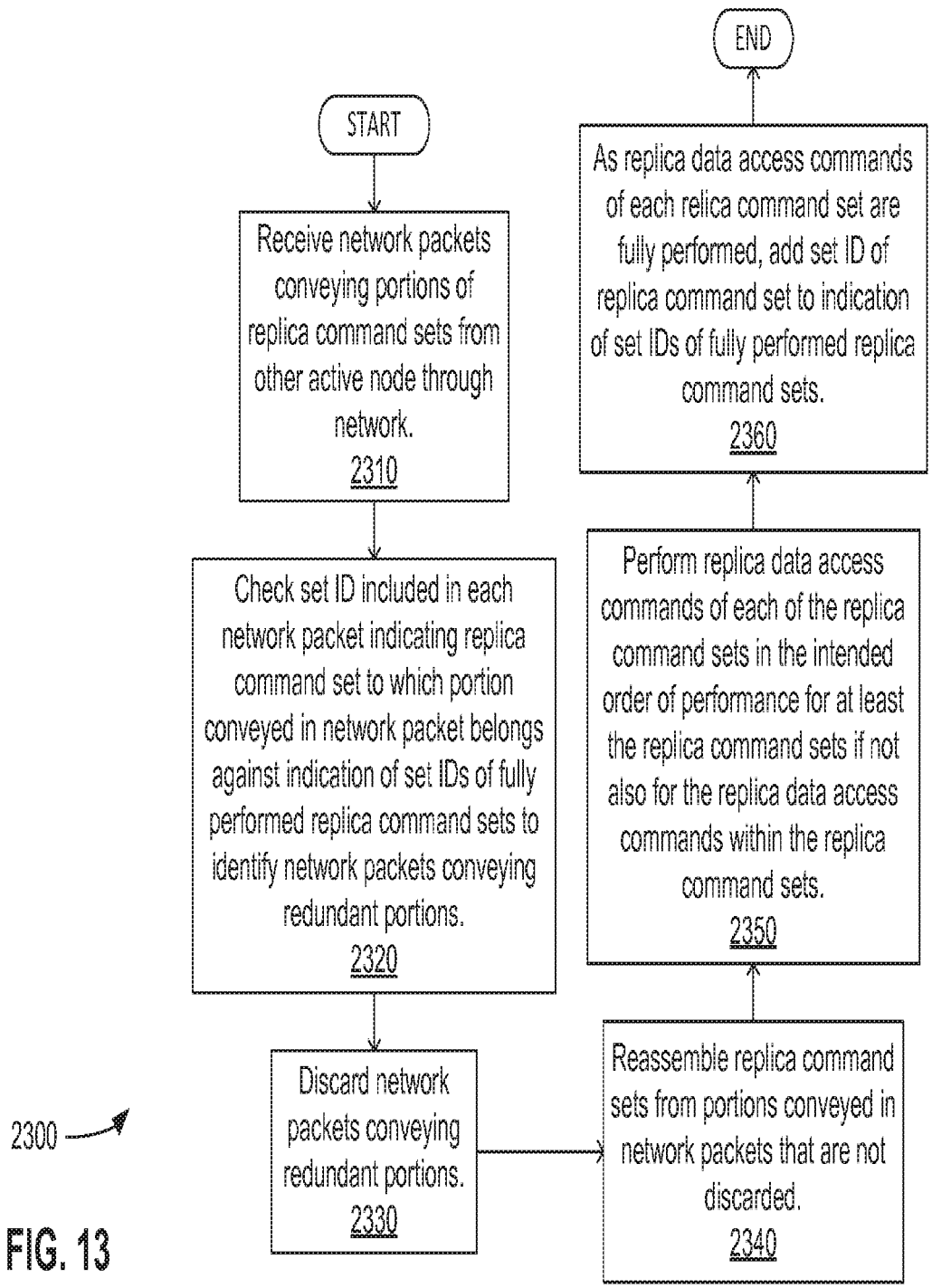
FIG. 13 illustrates a logic flow according to an embodiment.

FIG. 13 illustrates one embodiment of a logic flow 2300. The logic flow 2300 may be representative of some or all of the operations executed by one or more embodiments described herein. More specifically, the logic flow 2300 may illustrate operations performed by the processor component 650 in executing at least the control routine 640, and/or performed by other component(s) of the data storage module (D-module) 600.

At 2310, a processor component of a D-module of an active node of a second HA group of one cluster of a storage cluster system may receive network packets conveying portions of replica command sets from another active node that belongs to a first HA group of another cluster of the storage cluster system through an inter-cluster interconnect extending through a network. Examples of such active nodes may each be one of one of the nodes 300a-d of one of the HA groups 1600ab or 1600cd of the cluster 1300a of the storage cluster system 1000, or of the HA group 1600yz of the cluster 1300z of the storage cluster system 1000, where such nodes may be coupled by via the inter-cluster interconnect 399.

At 2320, the processor component may analyze the set ID included in each such network packet that indicates what replica command set the included portion of a replica command set belongs to against an indication of one or more set IDs associated with replica command sets in which the replica data access commands have been fully performed. As previously discussed, such a comparison enables identification of at least some network packets that include a portion of a replica command set that is redundant, since that replica command set has already been fully reassembled and all of its replica data access commands have been fully performed, thereby rendering the network packet conveying a portion of such a replica command set redundant. As has been explained, various characteristics of the network through which the inter-cluster interconnect coupling the two active nodes is routed may cause redundant network packets to be generated from the network packets exchanged between the two nodes.

At 2330, the processor component discards network packets that are identified as redundant due to their conveying redundant portions of replica command sets, and employs the network packets that are not discarded in reassembling one or more replica command sets at 2340. As has been explained various characteristics of the network through which the inter-cluster interconnect coupling the two active nodes is routed may cause network packets to be received at the active node in an order that is different from the order in which the other active node transmitted them. As a result, multiple ones of the replica command sets may be amidst being reassembled from the portions of replica command sets that may be received out of order.

At 2350, the processor component may perform the replica data access commands of each of the replica command sets. In so doing, the processor component may perform the replica data access commands in an order that follows their intended order of performance to the extent that all replica data access commands of each replica command set are fully performed before commencing performance of the replica data access commands of the next replica command set. However, within one or more of the replica command sets, the processor component may not follow the order of performance of the replica data access commands in some embodiments.

At 2360, as the replica data access commands of each replica command set are fully performed, the processor component may add the set ID of each of those replica command sets to the indication of set IDs associated with replica command sets in which the replica data access commands have been fully performed. In this way, this indication of set IDs employed at 2320 to identify redundant network packets to discard may be updated.

Figure 14:
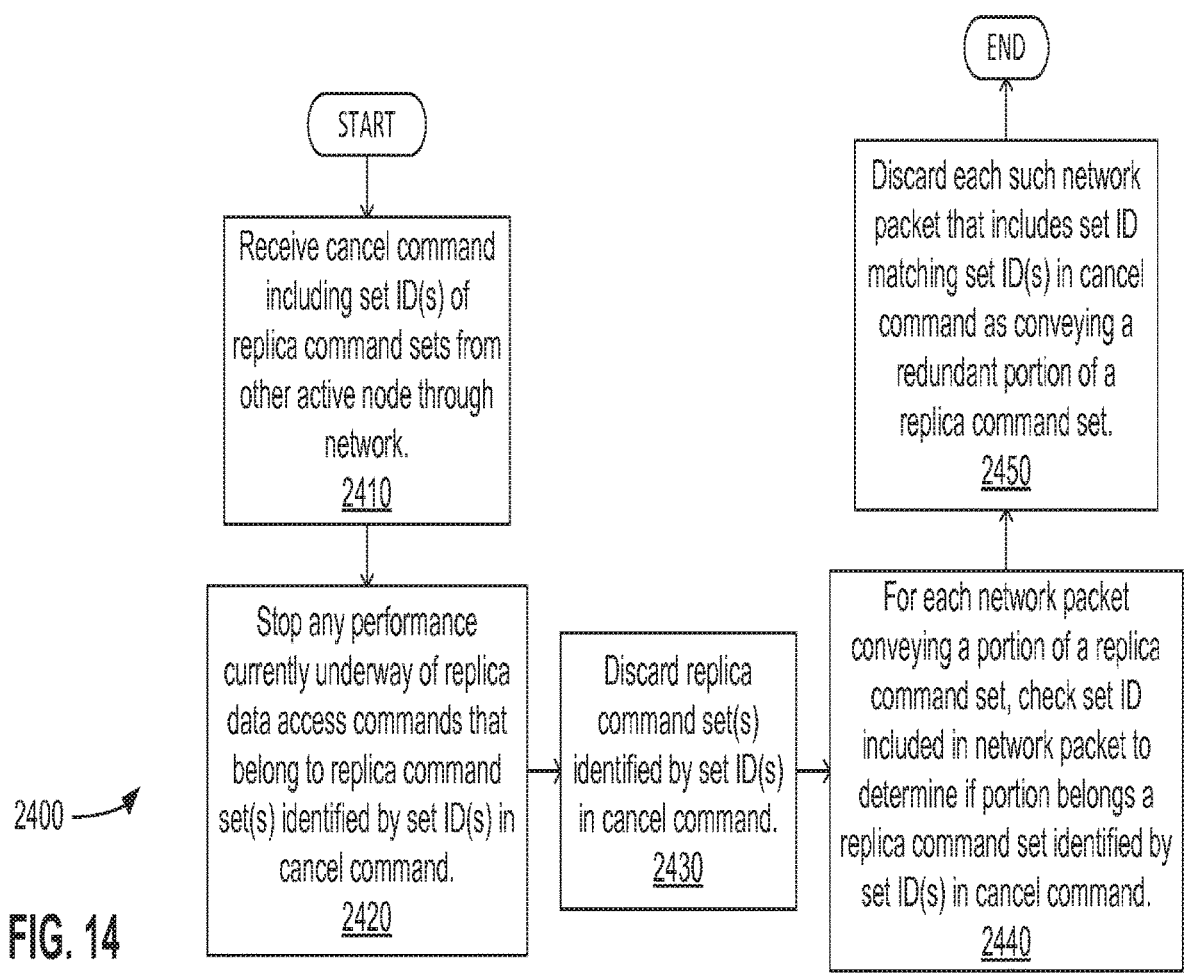
FIG. 14 illustrates a logic flow according to an embodiment.

FIG. 14 illustrates one embodiment of a logic flow 2400. The logic flow 2400 may be representative of some or all of the operations executed by one or more embodiments described herein. More specifically, the logic flow 2400 may illustrate operations performed by the processor component 650 in executing at least the control routine 640, and/or performed by other component(s) of the data storage module (D-module) 600.

At 2410, a processor component of a D-module of an active node of a second HA group of one cluster of a storage cluster system may receive a cancel command to cancel the performance of all replica data access commands within specified replica command sets from another active node that belongs to a first HA group of another cluster of the storage cluster system through an inter-cluster interconnect extending through a network. Examples of such active nodes may each be one of one of the nodes 300a-d of one of the HA groups 1600ab or 1600cd of the cluster 1300a of the storage cluster system 1000, or of the HA group 1600yz of the cluster 1300z of the storage cluster system 1000, where such nodes may be coupled by via the inter-cluster interconnect 399. The specified replica command sets may be so specified in the cancel command by indications included in the cancel command of set IDs assigned to those replica command sets.

At 2420, the processor component ceases any currently underway performance of a replica data access command that is among the specified replica command sets, and the processor component may discard the specified command sets at 2430. As previously explained, the discarding of a command set may entail refraining from performing its data access commands (at least the ones that haven't already been performed) and/or allowing the location at which the command set is stored to be overwritten with another command set that includes data access commands that are to be performed.

At 2440, the processor component may analyze the set ID included in each network packet received from the other active node that includes a portion of a replica command against the set IDs of the specified replica command sets. As previously discussed, such a comparison enables identification of at least some network packets that include a portion of a replica command set that is redundant. Given that the replica data access commands of the specified replica command sets are no longer to be performed as a result of receipt of the cancel command, any network packet conveying a portion of one of the specified replica command sets is effectively rendered redundant since no purpose would be served by reassembling any of the specified replica command sets from such portions conveyed in such network packets. At 2450, such redundant network packets conveying such redundant portions of one or more of the specified replica command sets are discarded.

Figure 15:
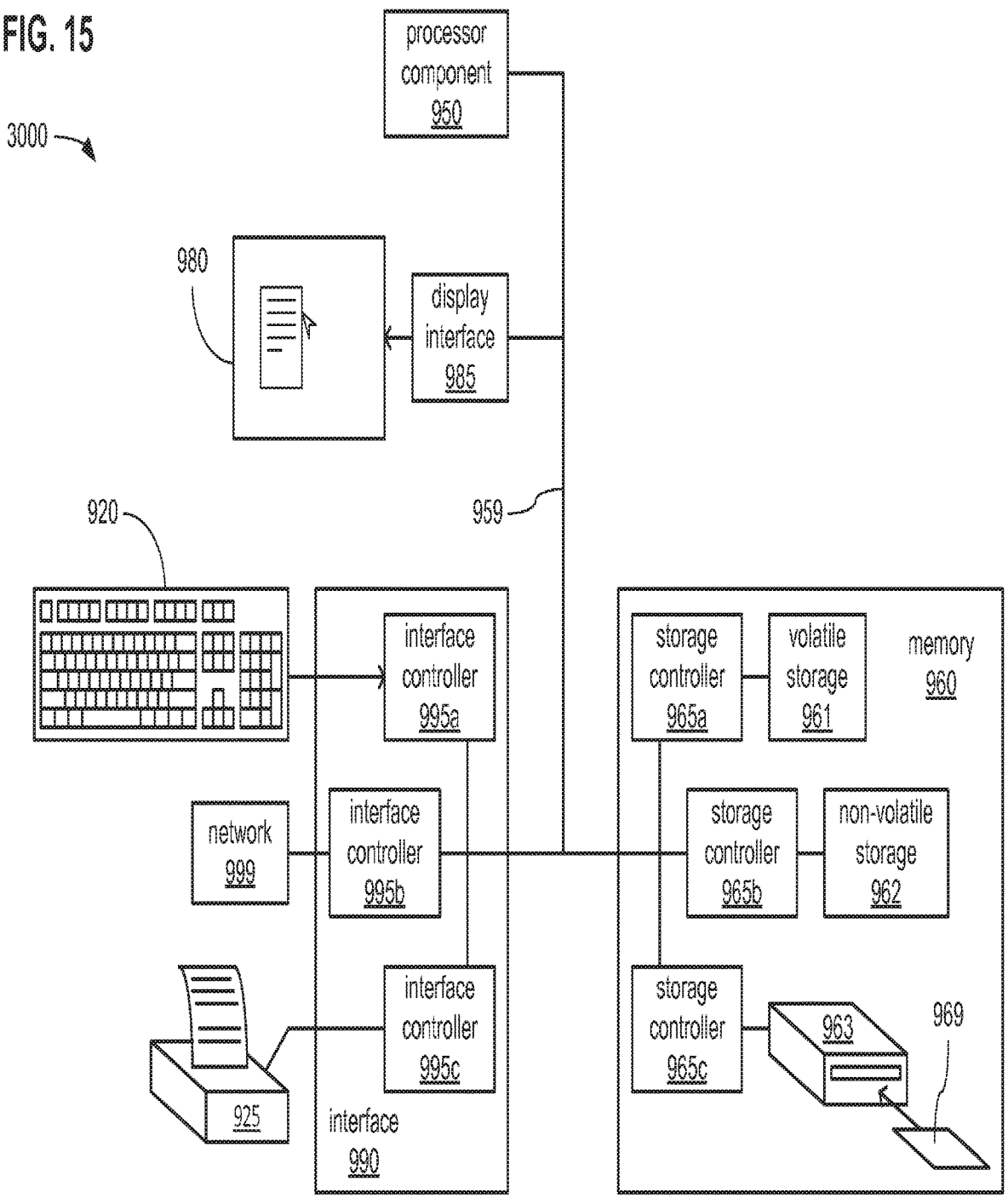
FIG. 15 illustrates a processing architecture according to an embodiment.

FIG. 15 illustrates an embodiment of an exemplary processing architecture 3000 suitable for implementing various embodiments as previously described. More specifically, the processing architecture 3000 (or variants thereof) may be implemented as part of one or more of the client devices 100, the M-modules 400, the N-modules 500, the D-modules 600 or the sets of storage devices 800$ab$, 800$cd$ or 800$yz$. It should be noted that components of the processing architecture 3000 are given reference numbers in which the last two digits correspond to the last two digits of reference numbers of at least some of the components earlier depicted and described as part of the modules 400, 500 and 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, an internal storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the internal storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 450, 550 and 650) may include any of a wide variety of commercially available processors, employing any of a wide variety of technologies and implemented with one or more cores physically combined in any of a number of ways.

As previously discussed, the internal storage 960 (corresponding to the storages 460, 560 and 660) may be made up of one or more distinct storage devices based on any of a wide variety of technologies or combinations of technologies. More specifically, as depicted, the internal storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the internal storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965$a$ providing an appropriate interface to the volatile storage 961 that perhaps employs row and column addressing, and where the storage controller 965$a$ may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for long-term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 490 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

The invention claimed is:

1. A method comprising:
  creating a first set of replica commands matching a first set of commands executed by a first node;
  assigning a first set of sequence identifiers to the first set of commands and to the first set of replica commands, wherein each command within the first set of commands and corresponding replica command within the first set of replica commands are assigned different sequence identifiers than other commands and replica commands, wherein the first set of sequence identifiers correspond to an order with which the first node executed the first set of commands, wherein the assigning comprises:
   assigning a first sequence identifier, comprising a first value derived from times at which the first sequence identifier is assigned to a first command and at which an event involving the first command occurs, to the first command and assigning a second sequence identifier, comprising a second value derived from times at which the second sequence identifier is assigned to a second command and at which an event involving the second command occurs, to the second command; and
  transmitting the first set of replica commands to a second node for execution according to the ordering defined by the first set of sequence identifiers.

2. The method of claim 1, comprising:
  creating a second command set based upon expiration of a time interval since creation of the first command set.

3. The method of claim 1, wherein a sequence identifier is assigned to a command within the first set of commands and the same sequence identifier is assigned to a replica command within the first set of replica commands, where the replica command is a replica of the command.

4. The method of claim 1, wherein commands within the first set of commands are executed by the first node in the order corresponding to the first set of sequence identifiers.

5. The method of claim 1, wherein replica commands within the first set of replica commands are executed by the second node in the order corresponding to the first set of sequence identifiers.

6. The method of claim 1, comprising:
  creating a new command set based upon expiration of a time interval.

7. The method of claim 1, comprising:
  creating a new command set based upon a detected change in metadata.

8. The method of claim 7, wherein the change in metadata affects performance of commands.

9. The method of claim 1, wherein the first set of sequence identifiers are incrementing or decrementing values.

10. The method of claim 1, comprising:
  grouping the first set of commands into the first command set based upon the first set of commands targeting a first version of metadata.

11. The method of claim 10, comprising:
  grouping a second set of commands into the second command set based upon the second set of commands targeting a second version of metadata.

12. The method of claim 11, wherein the first version is an earlier version than the second version.

13. A non-transitory machine readable medium comprising instructions for performing a method, which when executed by a machine, causes the machine to:
  create a first set of replica commands matching a first set of commands executed by a first node;
  assign a first set of sequence identifiers to the first set of commands and to the first set of replica commands, wherein each command within the first set of commands and corresponding replica command within the first set of replica commands are assigned different sequence identifiers than other commands and replica commands, wherein the first set of sequence identifiers correspond to an order with which the first node executed the first set of commands, comprising:
   assigning a first sequence identifier, comprising a first value derived from times at which the first sequence identifier is assigned to a first command and at which an event involving the first command occurs, to the first command and assigning a second sequence identifier, comprising a second value derived from times at which the second sequence identifier is assigned to a second command and at which an event involving the second command occurs, to the second command; and transmit the first set of replica commands to a second node for execution according to the ordering defined by the first set of sequence identifiers.

14. The non-transitory machine readable medium of claim 13, wherein the instructions cause the machine to:
grouping a set of commands into a command set based upon enforcement of a maximum interval of time allowed for grouping commands into command sets.

15. The non-transitory machine readable medium of claim 13, wherein the instructions cause the machine to:
grouping a set of commands into a command set such that no two commands within the set of commands are associated with a same portion of client device data.

16. The non-transitory machine readable medium of claim 13, wherein the instructions cause the machine to:
grouping a set of commands into a command set such that no two commands within the set of commands are associated with a same portion of a storage device.

17. A computing device comprising:
a memory comprising machine executable code for performing a method; and
a processor coupled to the memory, the processor configured to execute the machine executable code to cause the processor to:
create a first set of replica commands matching a first set of commands executed by a first node;
assign a first set of sequence identifiers to the first set of commands and to the first set of replica commands, wherein each command within the first set of commands and corresponding replica command within the first set of replica commands are assigned different sequence identifiers than other commands and replica commands, wherein the first set of sequence identifiers correspond to an order with which the first node executed the first set of commands, comprising:
assigning a first sequence identifier, comprising a first value derived from times at which the first sequence identifier is assigned to a first command and at which an event involving the first command occurs, to the first command and assigning a second sequence identifier, comprising a second value derived from times at which the second sequence identifier is assigned to a second command and at which an event involving the second command occurs, to the second command; and
transmit the first set of replica commands to a second node for execution according to the ordering defined by the first set of sequence identifiers.

18. The computing device of claim 17, wherein the machine executable code causes the processor to:
grouping the first set of commands into the first command set based upon the first set of commands targeting a first version of metadata.

19. The computing device of claim 18, wherein the machine executable code causes the processor to:
grouping a second set of commands into the second command set based upon the second set of commands targeting a second version of metadata.

20. The computing device of claim 19, wherein the first version is an earlier version than the second version.

* * * * *